(12) United States Patent
Boroditsky et al.

(10) Patent No.: US 7,046,931 B2
(45) Date of Patent: May 16, 2006

(54) METHOD FOR PROVIDING HIGH CONNECTIVITY COMMUNICATIONS OVER A PACKET-SWITCHED OPTICAL RING NETWORK USING COMPOSITE PACKETS

(75) Inventors: Mikhail Boroditsky, Highlands, NJ (US); Nicholas J. Frigo, Red Bank, NJ (US)

(73) Assignee: AT&T Corp., New York, NY (US)

( * ) Notice: Subject to any disclaimer, the term of this patent is extended or adjusted under 35 U.S.C. 154(b) by 712 days.

(21) Appl. No.: 09/995,692

(22) Filed: Nov. 29, 2001

(65) Prior Publication Data

US 2002/0089717 A1 Jul. 11, 2002

Related U.S. Application Data

(62) Division of application No. 09/973,699, filed on Oct. 11, 2001.

(60) Provisional application No. 60/240,464, filed on Oct. 13, 2000, provisional application No. 60/239,766, filed on Oct. 12, 2000.

(51) Int. Cl.
*H04L 12/56* (2006.01)

(52) U.S. Cl. .............................. 398/49; 398/54; 398/47; 398/51; 398/59; 370/404; 370/405; 370/406

(58) Field of Classification Search ................. 398/54, 398/21, 47, 51, 59, 75; 370/401–404
See application file for complete search history.

(56) References Cited

U.S. PATENT DOCUMENTS 5,600,466 A * 2/1997 Tsushima et al. ............. 398/79

OTHER PUBLICATIONS

Chlamtac, I et al., "Scalable WDM Access Network Architecture based on Photonic Slot Routing," IEEE/ACM Trans. On Networking, IEEE Inc. NY, US vol. 7, No. Feb. 1999.*

Chlamtac, I., et al. "Scalable WDM Access Network Architecture Based on Photonic Slot Routing", IEEE/ACM Transactions on Networking, IEEE Inc., NY, vol. 7, No. 1, Feb. 1999.

(Continued)

*Primary Examiner*—David C. Payne

(57) ABSTRACT

A method for providing high connectivity communications over a packet-switched optical ring network comprises a core optical ring having at least one node, the node being coupled to a subtending system by an optical crossbar switch, a source for generating a set of packets, a stacker for forming a first composite packet from the set of serial packets, the stacker coupled to the optical crossbar switch, and the stacker further coupled to the source for generating the set of packets, the first composite packet being parallel packets in a single photonic time slot, the first composite packet to be added to the core optical ring in a vacant photonic time slot via the optical crossbar switch, a second composite packet propagating on the core optical ring destined to be dropped at the node for further distribution on the subtending system via the optical crossbar switch, an unstacker for serializing the second composite packet dropped at the node, the unstacker coupled to the optical crossbar switch and a detector for distributing the serialized packets to a further destination by the subtending system. The source for generating the set of packets may be generated, for example, serially by a tunable laser or may be generated, for example, in parallel by an array of lasers.

5 Claims, 28 Drawing Sheets

OTHER PUBLICATIONS

Zang, H., et al., "Photonic Slot Routing in All-Optical WDM Mesh Networks", Global Telecommunications Conf., Globecom'99, IEEE, vol. 2, p. 1449.

Kannan, R., et al., "STWnet: A High Bandwidth Space-Time-Wavelength Multiplexed Optical Switching Network", IEEE, 1997, p. 777.

Kang, C.-S., et al., "A Broadband Ring Network: Multichannel Optical Slotted Ring", Computer Networks and ISDN System 27 (1995), 1387-1398.

C. Dragone, "An N×N Optical Multiplexer Using a Planar Arrangement of Two Star Couplers", IEEE Photonics Technology Letters, vol. 3, No. 9, Sep. 1991, pp. 812-815.

C. Dragone, C.A. Edwards and R.C. Kistler, "Integrated Optics N×N Multiplexer on Silicon", IEEE Photonics Technology Letters, vol. 3, No. 10 Oct. 1991, pp. 896-899.

I. Chlamtac, V. Elek, A. Fumagalli and C. Szabó "Scalable WDM Access Network Architecture Based on Photonic Slot Routing", IEEE/ACM Tranactions on Networking, vol. 7, No. 1, Feb. 1999, pp. 1-9.

L.J.P. Ketelsen, J.E. Johnson, D.A. Ackerman, L. Zhang, K.K. Kamath, M.S. Hybertsen, K.G. Glogovsky, MW. Focht, W.A. Asous, C.L. Reynolds, C.W. Ebert, M. Park, C.W. Lentz, R.L. Hartman and T.L. Koch; "25 Gb/s transmission over 680 km using a fully stabilized 20 channel DBR laser with monolithically integrated semiconductor optical amplifier, photodetector, and electroabsorption modulator," Trends in Optics and Photonics TOPS vol. 37, OFC 2000, pp. PD14-1/208-210.

* cited by examiner

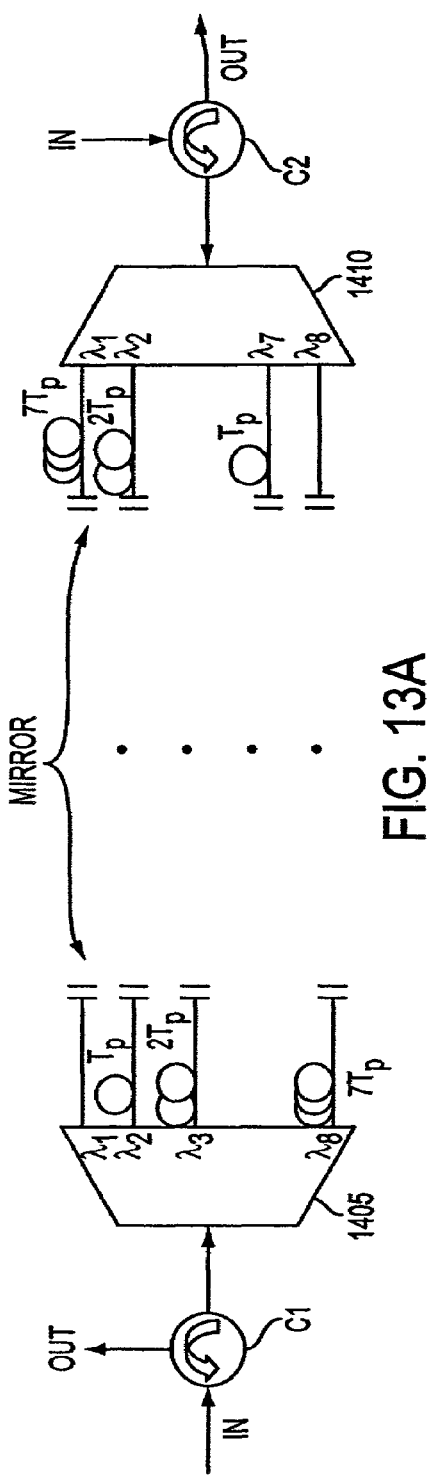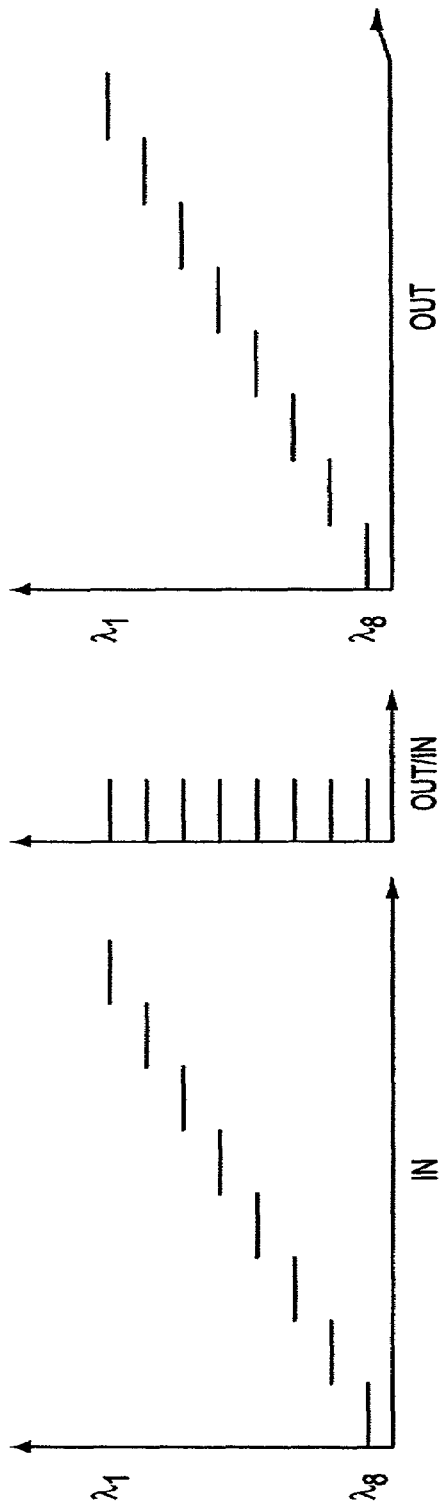
FIG. 13A
FIG. 13B
FIG. 13C
FIG. 13D

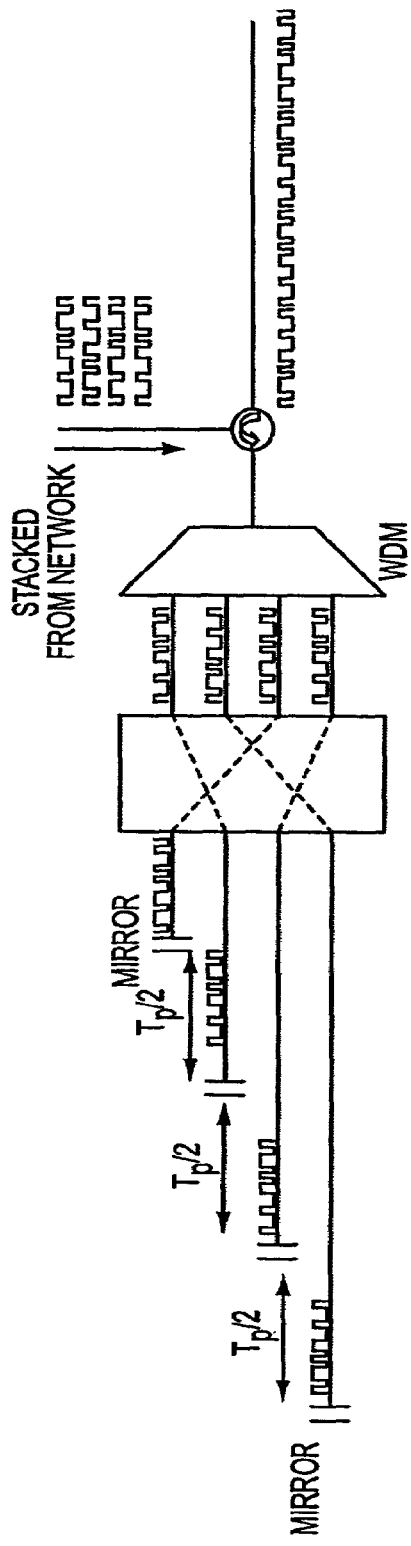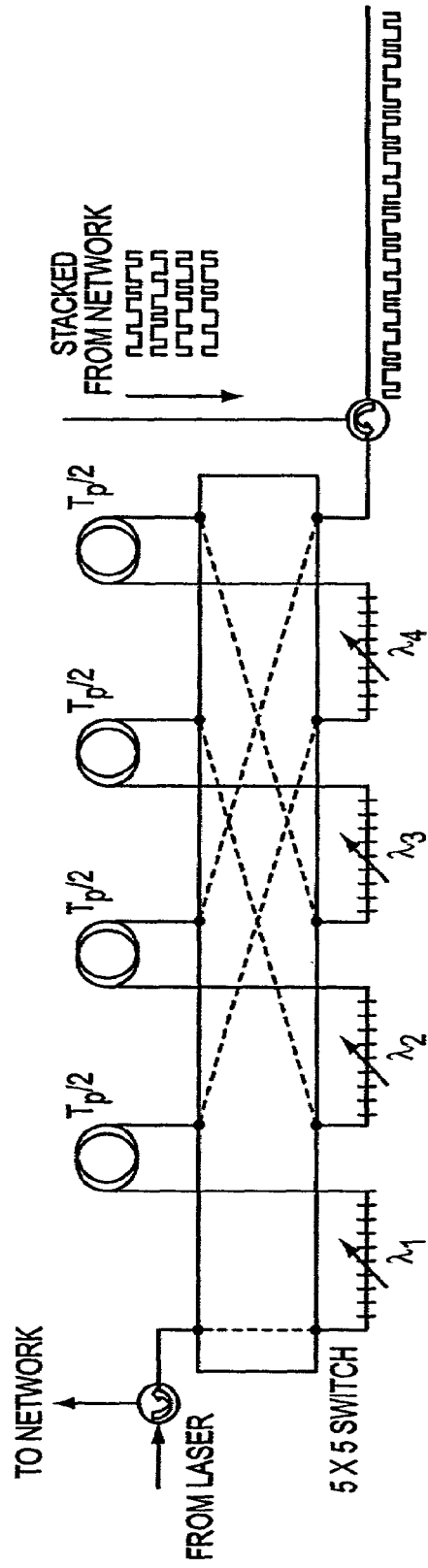
FIG. 26A
FIG. 26B

METHOD FOR PROVIDING HIGH CONNECTIVITY COMMUNICATIONS OVER A PACKET-SWITCHED OPTICAL RING NETWORK USING COMPOSITE PACKETS

This application is a Divisional of U.S. application Ser. No. 09/973,699, filed Oct. 11, 2001.

This application claims the benefit of priority of U.S. Provisional Application No. 60/240,464 filed Oct. 13, 2000 entitled "Composite Packet-Switching over WDM by Transparent Photonic Slot Routing". This application further claims the benefit of priority of U.S. Provisional Application No. 60/239,766 filed Oct. 12, 2000 entitled "High-Capacity Packet-Switched Ring Network".

FIELD OF THE INVENTION

The present invention relates generally to optical communications systems and in particular to composite packet-switching over WDM using transparent slot routing. The photonic slot routing ring networks use a novel packet stacking technique to add or drop packets, which are simultaneously time and wavelength division multiplexed.

BACKGROUND OF THE INVENTION

The capacity of WDM systems has been growing at a rate surpassing Moore's Law. Nevertheless, while telecommunication networks are evolving towards packet-switching, WDM systems still remain largely circuit-switched. Fast wavelength tunability is both a challenge and key to true packet-switched WDM networks. A tunable laser opens the possibility to connect from any WDM node to any other WDM node with a single transmitter, thus enhancing network flexibility and enabling smooth network upgrades. While tunable Distributed Bragg Reflector (DBR) lasers with nano-second wavelength tuning speed and fast wavelength insensitive optical switches with gigahertz responses are becoming commercially available, there seems to be no current cost-effective way to reconfigure wavelength add-drop multiplexers at an adequate speed. DBRs are a special type of laser mirror, which reflect light only in a narrow frequency band and allow tunable laser operation.

The previous work on photonic slot routing, as described in "*Scalable WDM access network based on Photonic Slot Routing*" by I. Chlamtac, V. Elek and C. Szabó published in *IEEE Transactions on Networking*, Vol. 7, No. 1, 1999, pp 1–9, implies distributed generation of packets, which implies more complicated scheduling of the packets. FIG. 1 is a simplified diagram of Chlamtac's proposal. The upper ring, with packets propagating counter-clockwise, is the core optical ring 110. The lower ring, with packets propagating clockwise and which Chlamtac refers to as the segment ring, will be herein referred to as subtending ring 120. The small rectangular boxes are nodes on each ring. Nodes on the core optical ring are denoted as 105. A 2×2 switch 125 is between the core optical ring 110 and a subtending ring 120. There is a plurality of nodes on a subtending ring, and at each node 115 on the subtending ring, there is a receiver tuned to a fixed optical wavelength. Multiple tunable lasers generate packets, with each tunable laser contributing one packet at one wavelength. That is, the generation of new packets is distributed, with each node capable of generating new packets. The system proposed by Chlamtac is lossy because Chlamtac uses power splitters since there are no Optical Add/Drop Multiplexers (OADMs), capable of operating at an adequate speed and power splitters are intrinsically lossy. That is, there is admission loss when the power splitters add channels. There is a significant under-utilization of the tunable lasers in the system proposed by Chlamtac because the lasers are used to generate only one packet at one wavelength.

There is a further necessity for the core optical ring in Chlamtac's proposed system to synchronize with a subtending ring, which is problematical in light of the optical buffers required by a subtending ring. The problem is exacerbated because there can be multiple subtending rings in the network, each of which require optical buffering. In Chlamtac's proposed system, an entire composite packet is dropped at a node on a subtending ring and the first node removes a packet (a portion of the composite packet) in which the node has an interest. The node can then add a new packet at the same wavelength or any other vacant wavelength, where a vacant wavelength is a wavelength not already present in the composite packet. If the first node of a subtending ring removes a packet of the composite packet and adds another packet to the packet, then a subsequent node on the subtending ring can read or inspect the added packet, which means that privacy is lost. This privacy loss may be unacceptable for certain applications.

The proposal described by Chlamtac also does not provide a way of dropping a part of an optical composite packet from the core ring. That is, the entire composite packet must travel around the subtending ring. Transparent bypass is a scheme where each node is transparent to those wavelengths in a packet that do not match the wavelengths present in the set of fiber Bragg gratings (FBGs) at the node. The concept of transparent bypass (and concomitant bandwidth re-utilization) was not disclosed by Chlamtac. Separate lasers are needed to generate different wavelengths, which means under-utilization of resources, and no implementation of the stacking means described herein was proposed. Distributed generation of packets implies a hierarchical synchronization scheme. Finally, the ability to tune the add/drop filters was not envisioned.

SUMMARY OF THE INVENTION

A novel photonic slot routing network for composite packet-switching is described. Photonic slot routing combines the features of both packet-switched (e.g., TDM) and WDM to achieve extremely high connectivity and flexibility while at the same time addressing the limitations of existing photonic switching technologies.

A communication method with extremely high connectivity and bandwidth utilization based on routing multi-channel packets using wavelength independent n×n optical switches on a cost-effective ring network is described. Composite packets, consisting of a multiplicity of packets that are generated at a multiplicity of distinct wavelengths and synchronized to occur in a single photonic time slot, are in one embodiment generated locally by a tunable laser source and are then stacked using a novel stacking technique. To achieve stacking, the plurality/multiplicity of packets are passed through the array of circulators and potentially reconfigureable fiber Bragg gratings (FBGs) separated by delay lines in order to align and synchronize in time domain the plurality of packets. Depending on the position of the optical switch, each time slot containing composite packets can be dropped or bypassed at a given node. The high connectivity of the network is realized by the fact that packets at any wavelength can be sent from any node to any other node by appropriate timing of switches. Furthermore, each composite packet, if dropped, can be further distributed to a multiplicity of users connected to that node by using, for example, WDM techniques. User connectivity at a node is not limited to an electrical connection and coupling but may also be any form of wireless connection or an optical connection.

The system and method described herein provides high connectivity by optical means when using a single laser source at a given node. This can be an economical solution for regional or local IP networks, which require high connectivity rather than high throughput. Such a solution would lower the initial installment costs for a metro network in the service space, permitting optical network providers to grow packet-based networks modularly with lower marginal costs than previously permitted. That is, capacity can be gradually increased by the addition of more lasers at each node. The system evolves modularly with demand. Thus, as the number of lasers is increased as needed to fill slots with data, the wavelength-independent switch passes more and more wavelengths. The system is intrinsically blind to format and to rate upgrades (as long as the packet time is kept constant) and the upgrades can be introduced on a "pay-as-you-go" basis. An IP-friendly WDM architecture insures a more efficient integration with IP networks. This reduces the system constraints down to an irreducible set: the packet length, the transparency of the switch nodes, and the bandwidth of the optical components in the system. Finally, the use of reconfigureable optical devices such as tunable fiber Bragg gratings (FBGs) further increases network reconfigurability and provisioning ability.

Compared to conventional optical systems, the system and method described herein would require less optical sources, less complicated optics in their nodes, and fewer electronic multiplexing and demultiplexing hardware to obtain the connectivity afforded by this approach. These potentially cost-effective and modular techniques for achieving this high connectivity are both novel and non-obvious.

An object, therefore, of the present invention is to provide a modular, cost-effective method for generating, switching and routing composite packets.

It is a further object of the present invention to provide high connectivity and bandwidth re-utilization using wavelength independent n×n optical switches on an optical ring network.

It is yet another object of the present invention to generate composite packets at each node (illustratively using a single rapidly tunable laser) to stack the composite packets in a given time slot for local insertion in an optical ring network, where the composite packets are simultaneously time division multiplexed and wavelength division multiplexed.

A further object of the present invention is to increase network reconfigurability and provisioning ability through the use of tunable filter.

BRIEF DESCRIPTION OF THE DRAWINGS

The invention is best described with reference to the detailed description and the following figures, where:

FIG. 13a illustrates the stacking and unstacking using a pair of WDMs and mirrors sandwiched between the WDMs on each line;

FIG. 13b is a graph depicting a serial stream of packets generated by a tunable laser;

FIG. 13c is a graph of a composite packet, which represents the output of a stacker. From the perspective of the unstacker it represents input;

FIG. 13d is a graph, which represents the serial stream of packets that is the result of the unstacking process;

FIG. 26a depicts a reconfigureable unstacker;

FIG. 26b depicts a reconfigureable stacker/unstacker;

DETAILED DESCRIPTION OF THE PREFERRED EMBODIMENTS

Figure 1:
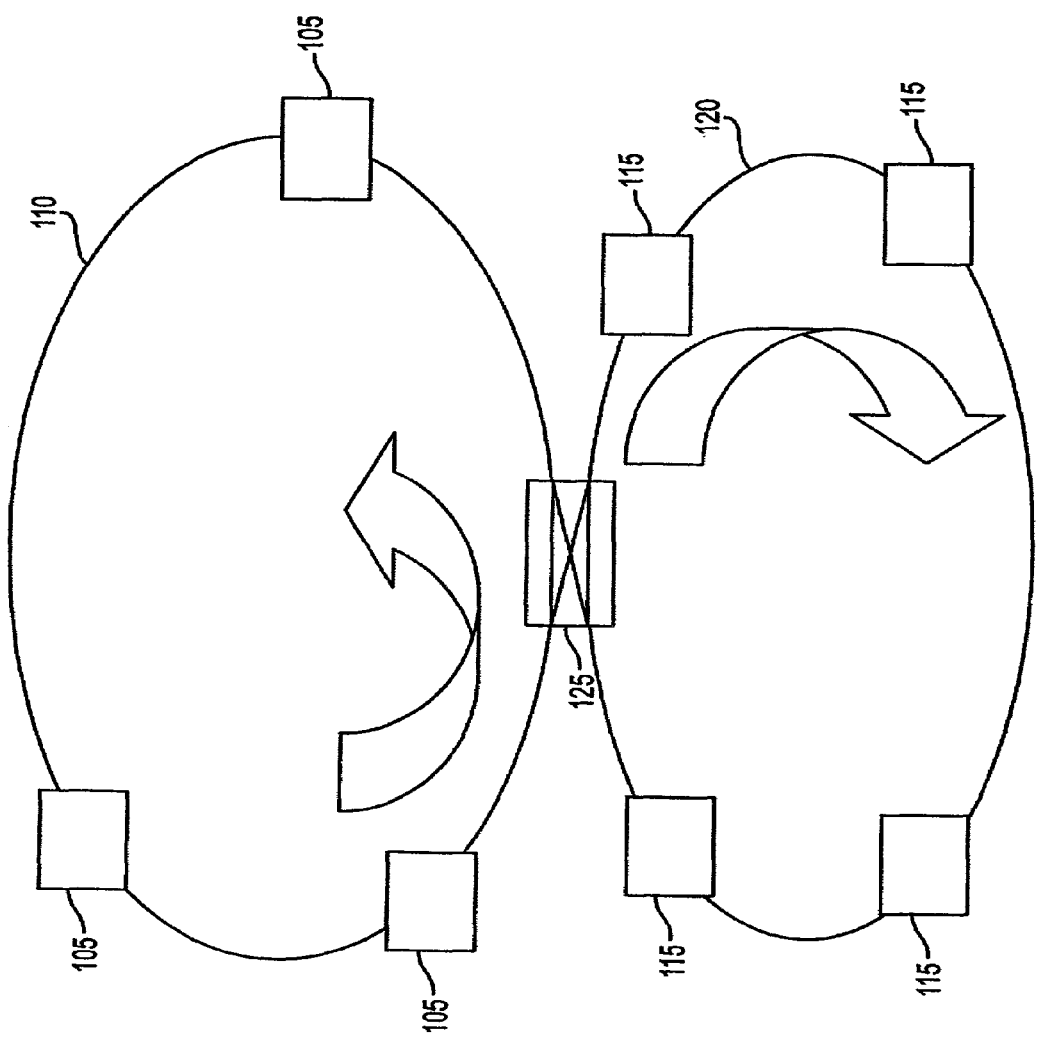
FIG. 1 is a simplified diagram of a prior art proposed system.
Figure 2:
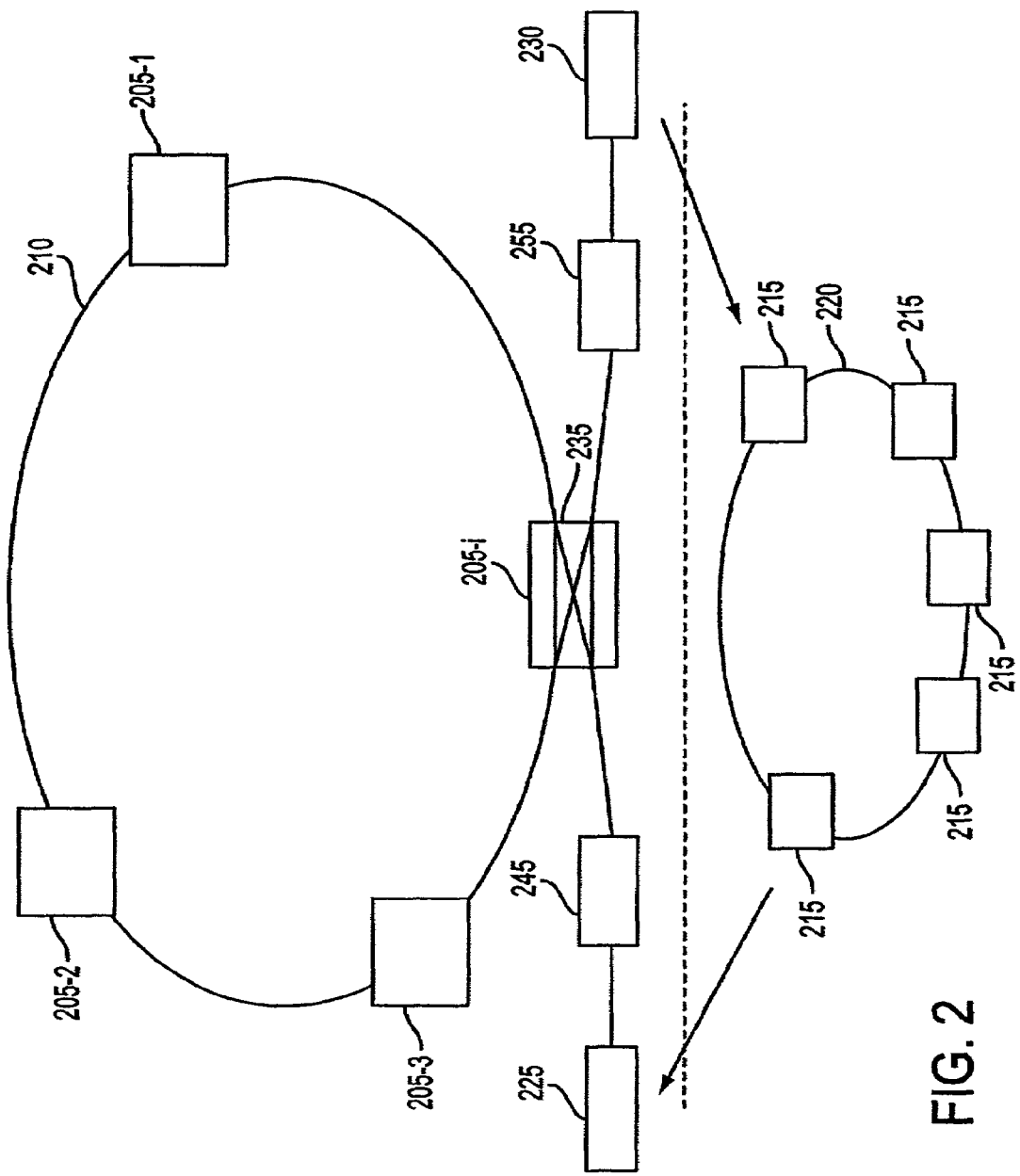
FIG. 2 is a diagram of the present invention from the perspective of the prior art proposed in FIG. 1.

FIG. 2 is a diagram of the present invention from the perspective of the prior art proposed in FIG. 1. In the present invention the core optical ring 210 has a plurality of nodes 205-1, . . . , 205-i with each node having a switch 235, which in the example in FIG. 2 is a 2×2 switch but which may be an n×n switch. There is a tunable laser 225, which generates packets locally and a receiver 230. Stacker 245 stacks the packets (at different wavelengths) generated by tunable laser 225 to form a composite packet in a single photonic time slot. Stacker 245 may be serial or parallel. Unstacker 255 unstacks or demultiplexes the packets locally. Unstacker 255 may be serial or parallel. The subtending system 220 also may have a plurality of nodes 215. A node comprises a switch, a transmitter (e.g. tunable laser), a stacker, an unstacker and a receiver (detector). The subtending system may or may not have an optical feed and may be a ring, a star, a bus or any other conventional distribution architecture. The core optical ring is connected to and communicates with the subtending system depicted in FIG. 2 via node 215. An arrow from the subtending pointing towards tunable laser 225 indicates communication from the subtending system to the core optical ring via node 215. An arrow from receiver 230 towards the subtending system indicates communication from the core optical ring to the subtending system via node 215. An out-of-band control channel is used to detect the state of the switch and to effect a change to the state of the switch.

The present invention generates packets locally instead of at each node of a subtending ring of Chlamtac. That is, there is one device for the subtending system of the present invention, which generates packets locally for the entire subtending system. In a preferred embodiment, that device is a tunable laser. Also there is no need for loop or ring synchronization. That is, there is no need to synchronize a subtending or a plurality of subtending systems with the core optical ring because the subtending system is not necessarily optically coupled to the core optical ring but rather may rely for further packet distribution on an electrical, wireless or other similar interface. That is, the packets are unstacked or demultiplexed at the local receiver of the present invention and are then available for further distribution electrically, optically or via a wireless interface. The above advantages also make the present invention easier to build and less lossy.

Figure 3:
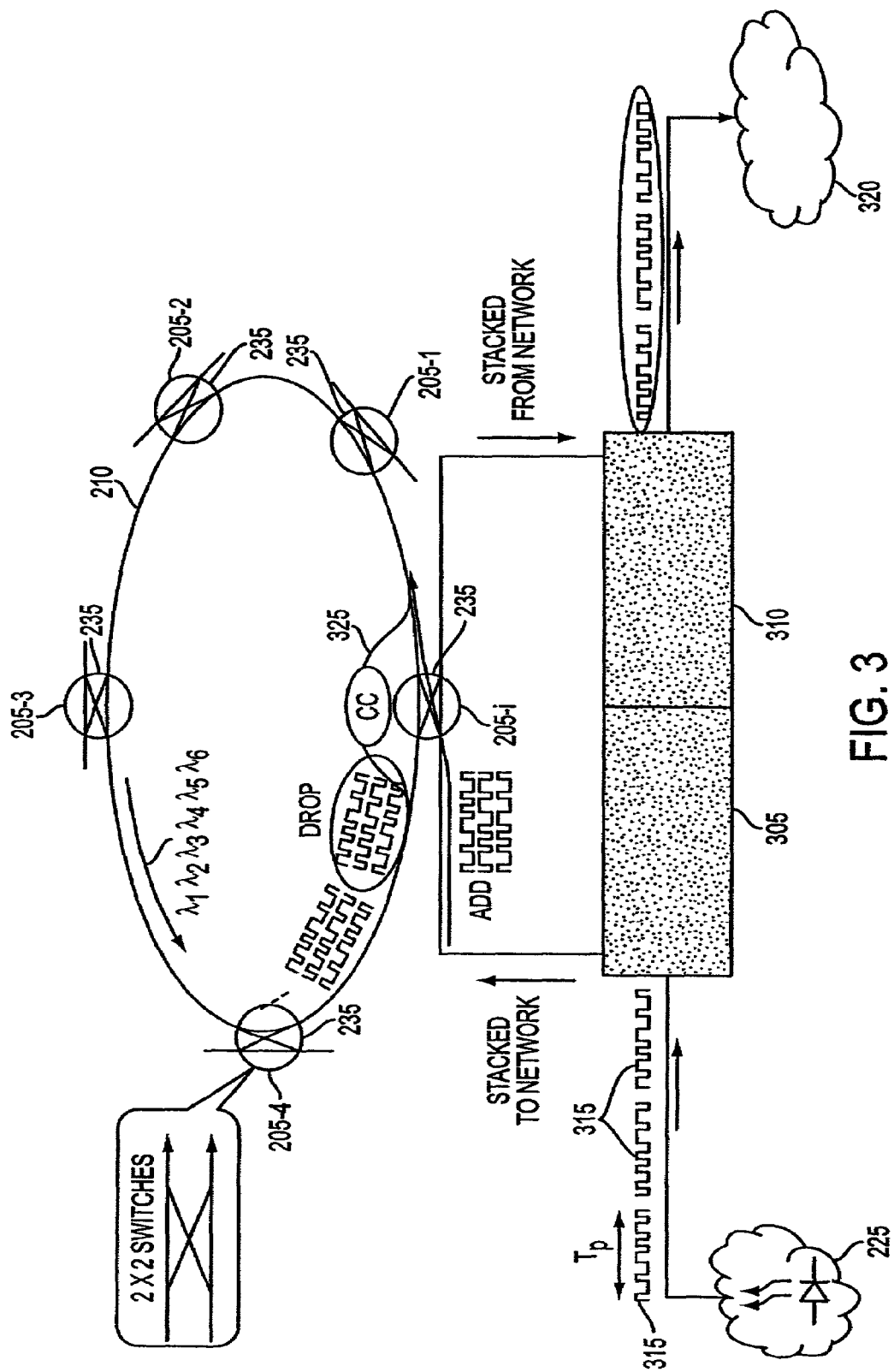
FIG. 3 is a simple block diagram of the architecture of the present invention.

FIG. 3 is a simple block diagram of the present invention. As with FIG. 2, there is a core optical ring 210 having a plurality of nodes 205-1, . . . , 205-i and their respective switches 235, which in this figure are 2×2 switches but which may be n×n switches. The tunable laser 225 for generating packets locally is on the far left and is an exemplary source of a stream of serial packets. The tunable laser is coupled to a stacker 305, which receives the packets 315 generated locally by the tunable laser. The locally generated packets are all at different wavelengths. The stacker receives the locally generated packets serially and "stacks" them so that there is a plurality of packets in a single time slot all at different wavelengths. That is, the stacker operates serially in this exemplary embodiment. There is a delay $T_p$ in the stacking of the serially generated packets to a set of parallel packets in a single time slot, i.e. a composite packet. The stacker is coupled to the core optical ring 210 via optical switch 235 of node 205-i and may add the plurality of stacked packets to the core optical ring for distribution.

In the meantime, the core optical ring may have packets destined for the exploded view node 205-i on the same subtending system. The stacked packets destined for a node or nodes on the subtending system or systems are able to be dropped using the same switch that is used to add packets from the subtending system to the core optical ring. The set of stacked packets to be dropped (further distributed on the subtending system) are received from the core optical ring at the unstacker 310 and unstacked from a single set of parallel packets, all in different wavelengths, to a serial stream of a plurality of packets, all in different wavelengths. That is, the unstacker operates serially in this exemplary embodiment. A moment before the arrival of the single set of parallel packets to be dropped, the 2×2 switch flips into the cross state, and the packet is dropped. At the same time, a single set of parallel packets created locally is added to the ring. Suppose that the next single set of parallel packets is not destined for any nodes of the subtending system, then the 2×2 switches to the bar state so that the single set of parallel packets bypasses the subtending ring. The stacker and unstacker may be two separate devices or may be interleaved sharing some components. An out-of-band control channel 325, operating at a different wavelength, performs a variety of functions including signaling the switch regarding the state into which it needs to configure itself. This control channel needs to be provisioned and may also provide functions such as operations control, maintenance and scheduling. The detector 320 communicates with a distribution system and is the mechanism by which the distribution system receives information from and forwards information to the core optical ring. The detector 320 further distributes the plurality of serial packets to other possible nodes on the subtending system electrically, via a wireless interface or optically.

Figure 4:
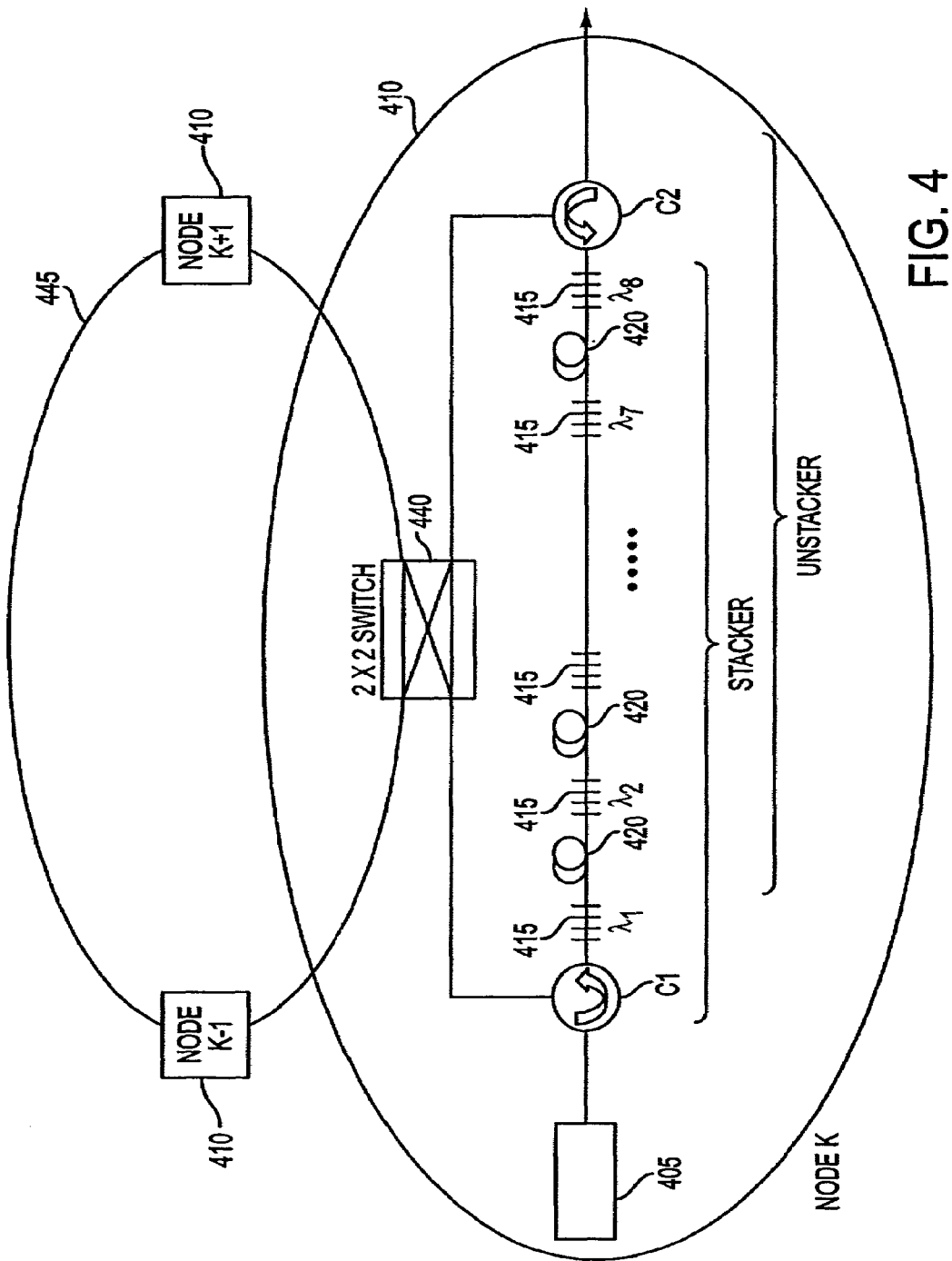
FIG. 4 is a simple diagram of the architecture of the composite packet photonic slot routing network.

FIG. 4 is a simple diagram of the architecture of the composite packet photonic slot routing network of the present invention. Core optical ring 445 has a plurality of nodes 410. At each node, a switch 440 couples the core optical ring to a subtending ring. The switch is depicted on FIG. 4 as a 2×2 switch but the switch may be a n×n switch. Tunable laser 405 is used to generate a serial stream of packets, all at different wavelengths. Fiber Bragg gratings 415 and time delays 420 in combination with circulator C1 are used to stack the serial stream of packets into a single composite packet in a single time slot with each of the parallel packets at a different wavelength. Fiber Bragg gratings 415 and time delays 420 in combination with circulator C2 are used to unstack a composite packet dropped at the node. The composite packet is unstacked to form a serial stream of packets for further distribution on the subtending ring. The stacker and unstacker are depicted herein as having interleaved components. The stacker does not include circulator C2 and the unstacker correspondingly does not include circulator C1. Both the stacker and unstacker operate serially in this exemplary embodiment.

Figure 5:
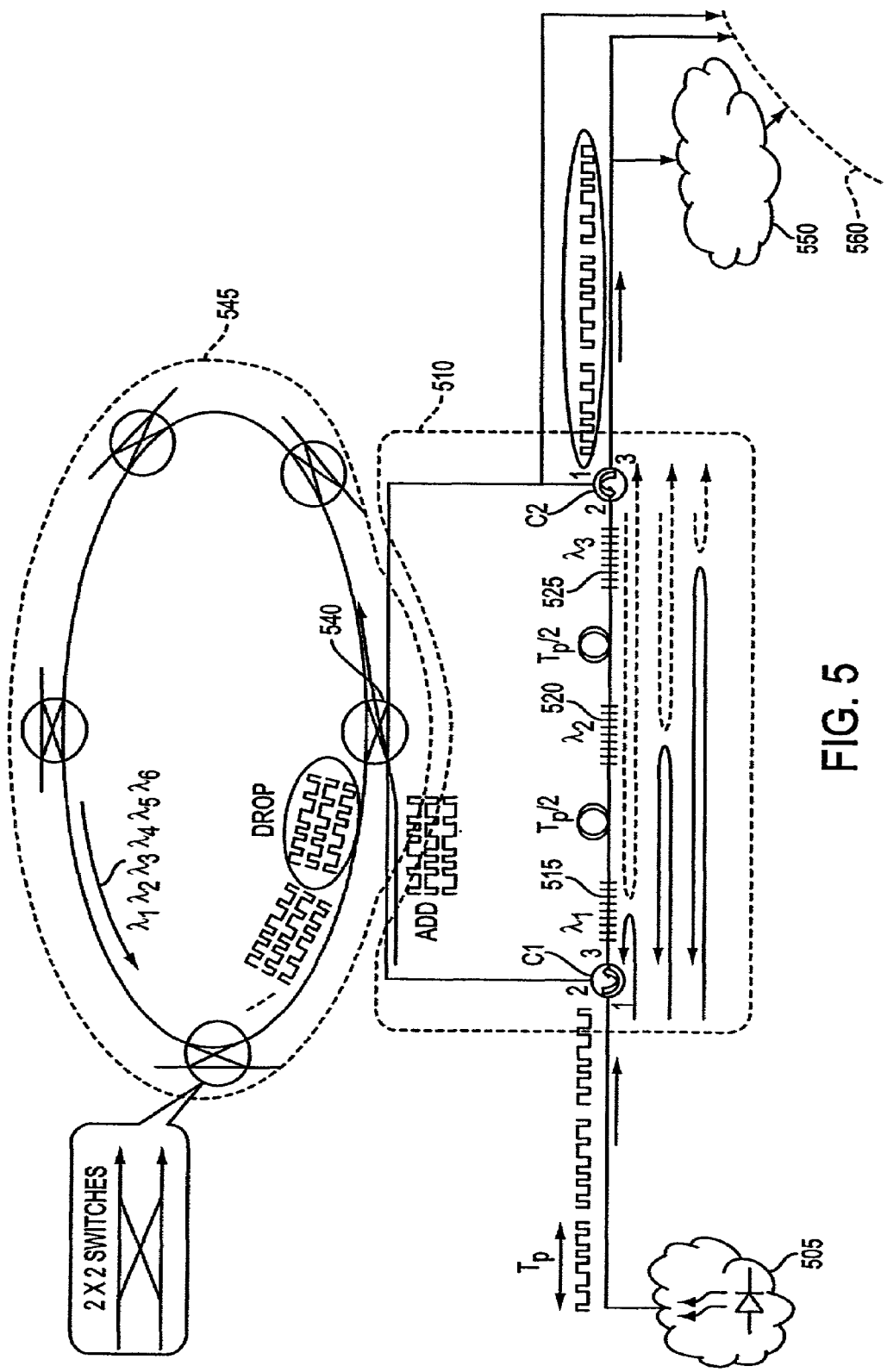
FIG. 5 depicts the architecture for composite-packet photonic slot routing.

FIG. 5 shows the architecture of the composite packet photonic slot routing network. A composite packet consists of a multiplicity of fixed length packets that are synchronized in a single time slot but at different wavelengths, where exemplary packet 1 is at wavelength $\lambda_1$, exemplary packet 2 is at wavelength $\lambda_2$ and exemplary packet 3 is at wavelength $\lambda_3$. Individual wavelengths (exemplary packets at wavelengths $\lambda_1$, $\lambda_2$ and $\lambda_3$) in a composite packet are generated serially by a single rapidly tunable laser source 505 at each node. These packets are sent to a wavelength stacker/unstacker 510 consisting of two optical circulators $C_1$ and $C_2$ with cascaded equally spaced fiber Bragg gratings (FBG) 515, 520 and 525 connected to and sandwiched in between the optical circulators. Stacker/unstacker in 510 consists of interleaved components, which share optical components. As illustrated in FIG. 5, packets generated by the tunable laser go through an optical circulator $C_1$ and travel down the FBG string. If the tunable laser dwells on, for example, three wavelengths (different colors), each for a period $T_p$, judicious spacing of the gratings and the circulator will "stack" the three differently colored packets into the same time slot. This effectively leads to a bit rate multiplication in a given time slot, so that a passive optical technique is being used to multiply the data transport rate by a factor of three without the use of additional electrical power or electronic circuitry. This novel photonic "stacking" technique thus allows a cost-effective approach to higher transport rates, and comprises the input to the ring node.

Each FBG reflects a specific wavelength as indicated and is transparent to all other wavelengths. The reflected packets all emerge from the third port of $C_1$, which is connected to the ring network 545 through a 2×2 polarization and wavelength insensitive optical switch 540. The switch is depicted in FIG. 5 as a 2×2 switch but may be a n×n switch. Thus, the packet at wavelength $\lambda_3$ is generated first but will undergo the most delay in the stacker. The packet at wavelength $\lambda_2$ is generated with a delay of $T_p$ relative to the $\lambda_3$ packet. If the separation between adjacent FBGs is set to $T_p/2$, then $\lambda_2$ packets experience $T_p$ less delay in the stacker compared to $\lambda_3$ packets. Finally, the last packet is generated at wavelength $\lambda_1$ and experiences $2T_p$ less delay than the first packet at $\lambda_3$. Consequently, the serial packets generated by the tunable DBR laser at different wavelengths are stacked into the same photonic time slot as a composite packet. The above is not the only way to create a composite packet. An alternative embodiment includes but is not limited to using an arrayed waveguide grating router (AWGR). With different delays for different outputs, this approach eliminates cascading losses in the FBGs for systems with many channels.

The composite packets traveling on the ring network are routed using 2×2 wavelength insensitive optical crossbar switches 540 at each node. The 2×2 optical switch 540 drops a composite packet, and adds the newly created composite packet into a vacant photonic time slot in the ring or does both (drops and adds) at the same time. To add and/or drop a composite packet to and/or from the core optical ring, the wavelength insensitive optical crossbar switch is flipped into the cross state. For a composite packet to bypass a node, the optical crossbar switch may be in the bar state or in the cross state if a transparent pass-through algorithm as described later is used.

Viewing the ring node itself, one sees that when the 2×2 switch is in the "cross" position, a composite packet that is arriving at the node is dropped from the ring, and another composite packet, the newly generated composite packet described above, can be added to the ring at the same time. The same set of gratings can be used to serialize or re-serialize the received packet and to detect it at a lower bit rate, i.e., using the same optical technique to demultiplex from the transport rate down to the original line rate, again without using electronics (as shown on the right hand side of FIG. 5). The serialized or re-serialized packets can then be forwarded on to a subtending system 560 via a detector 550 for further distribution to a destination node. This is indicated in FIG. 5 by the line from the detector to the subtending system. Alternatively, the received composite packet can be further optically detected in parallel or routed to a user site connected to a subtending system according to its constituent wavelengths (colors). This is indicated by the line from the horizontal line extending from just above the label C2 that goes to the subtending system 560. Both the stacker and the unstacker operate serially in this exemplary embodiment. Yet another alternative embodiment is to serialize or re-serialize the packets and forward the packets directly to the subtending system bypassing the detector. In this alternative, the unstacker operation would be parallel. This is indicated by the line from the serialized or re-serialized packets that bypasses the detector and goes to the subtending system. User connectivity at a node is not limited to an electrical connection and coupling but may also be any form of wireless connection. Thus, a multiplicity of subscribers can be served on each node by performing a demultiplexing either passively with WDM, or actively by packet-switching (e.g., TDM), with all detected signals at the original line rate, not at the transport rate.

From the network viewpoint, since the packets are routed on a time slot basis, users at each node can send packets to users at any other node by creating a composite packet that is inserted at the time the destination node will drop a composite packet. The two-dimensional multiplexing in both wavelength and time domains can significantly enhance the network connectivity. Segregation of the packet-switched optical ring network traffic into TDM and WDM permits wavelength reuse: a given wavelength in one slot goes to one user, while the same wavelength in another slot goes to another user at a different node because that composite packet or any portion thereof in that photonic time slot is dropped by that different node. The coding by WDM to differentiate users at the destination thus provides high connectivity in the network. Essentially, this enables fall mesh connectivity BELOW the node level without the need for electronic rate multiplexing and demultiplexing. By design, each node is transparent to those wavelengths in the packet that do not match the wavelengths present in the set of fiber Bragg gratings. This permits a transparent node bypass.

There are several network enhancements that improve the usefulness of the network. An out-of-band broadcast channel for scheduling of traffic is suggested. The fiber Bragg gratings used in the nodes can be made tunable for even higher network flexibility on a dynamic or provisioning basis, but not on a per-packet basis with current technology. To maintain the composite packet synchronization in a moderate scale network, span-by-span chromatic dispersion compensation may be needed. A credit-based medium access control protocol featuring both good capacity utilization and simple admission control has also been proposed. The scheduling and credit-based MAC protocol schemes related to the present invention have been described in a separate U.S. Provisional Patent Application entitled "High-Capacity Packet-switched Ring Network" by Mikhail Boroditsky, Aleksandra Smiljanic and Nicholas J. Frigo filed on Oct. 12, 2000 having U.S. Ser. No. 60/239,766 and the details of the invention described therein are incorporated herein by reference.

Figure 6:
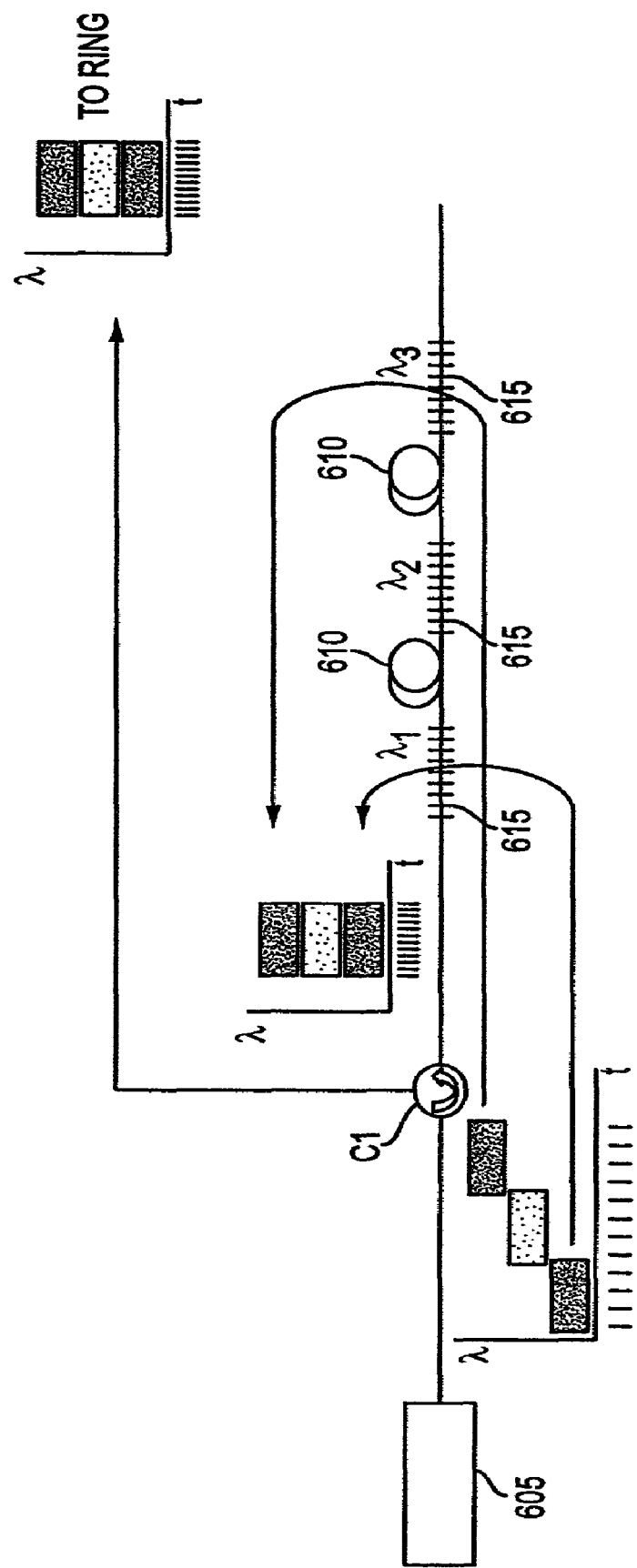
FIG. 6 illustrates the stacker portion of FIG. 5.

FIG. 6 illustrates the serial operation of the stacker portion of FIG. 5. Tunable laser 605 is at the far left and the serial packets at different wavelengths are depicted in a stair step configuration. The serial packets are fed through a circulator C1, a plurality of time delays 610 and a plurality of fiber Bragg gratings (FBGs) 615 each at different wavelengths, which each reflect one specific wavelength. The result of this scheme is to stack the serial stream of packets generated by the tunable laser to form a composite packet in which the serial packets generated by the tunable laser are all contained in parallel within one time slot. The composite packet is then able to be added to the core optical ring. This novel scheme is a passive technique to multiply the bit rate and to accomplish serial-to-parallel conversion. The FBGs are a mature technology. The tunable DBR lasers have been announced and have a very short switching time. Since tuning speed of active components is superior to that of passive components, it is advisable to use fast lasers and wavelength non-selective switching and fixed passive components. The spacing between the fiber Bragg gratings must correspond to half of the packet length.

Figure 7:
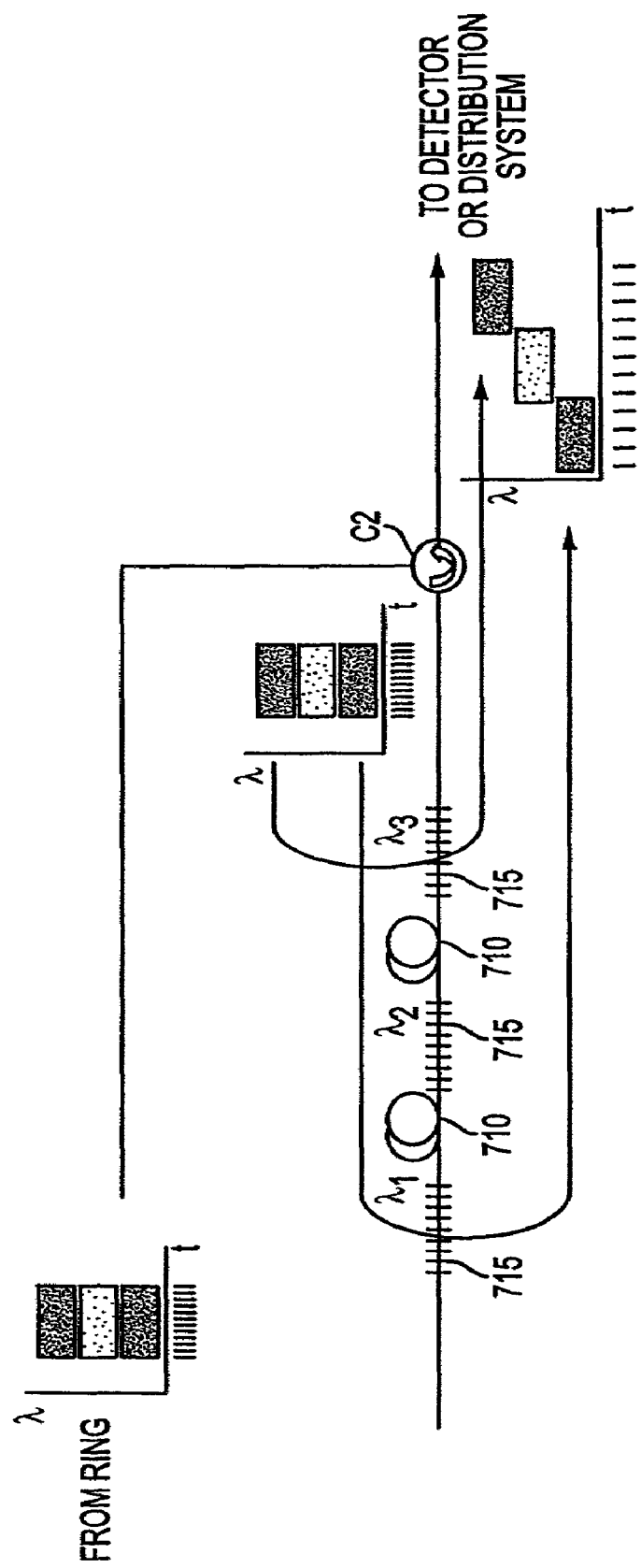
FIG. 7 depicts the unstacker portion of FIG. 5.

FIG. 7 depicts the serial operation of the unstacker portion of FIG. 5. A composite packet is being dropped from the core optical ring for further distribution to a node on the subtending ring. The composite packet is contained within a single time slot and is a set of parallel packets, all at different wavelengths. The composite packet is fed into circulator C2. The circulator C2 in combination with time delays 710 and the FBGs 715 cause the composite packet to be unstacked or demultiplexed into a serial stream of packets, all at different wavelengths. The re-serialized stream of packets is then further distributed to the appropriate destination via the detector. The novel scheme presented herein results in a parallel-to-serial conversion of the composite packet and further distribution is effected electrically or via a wireless interface. Alternatively, instead of re-serialization and detection of the entire photonic stack, the composite packet can be routed within the subtending ring by wavelength.

Figure 8:
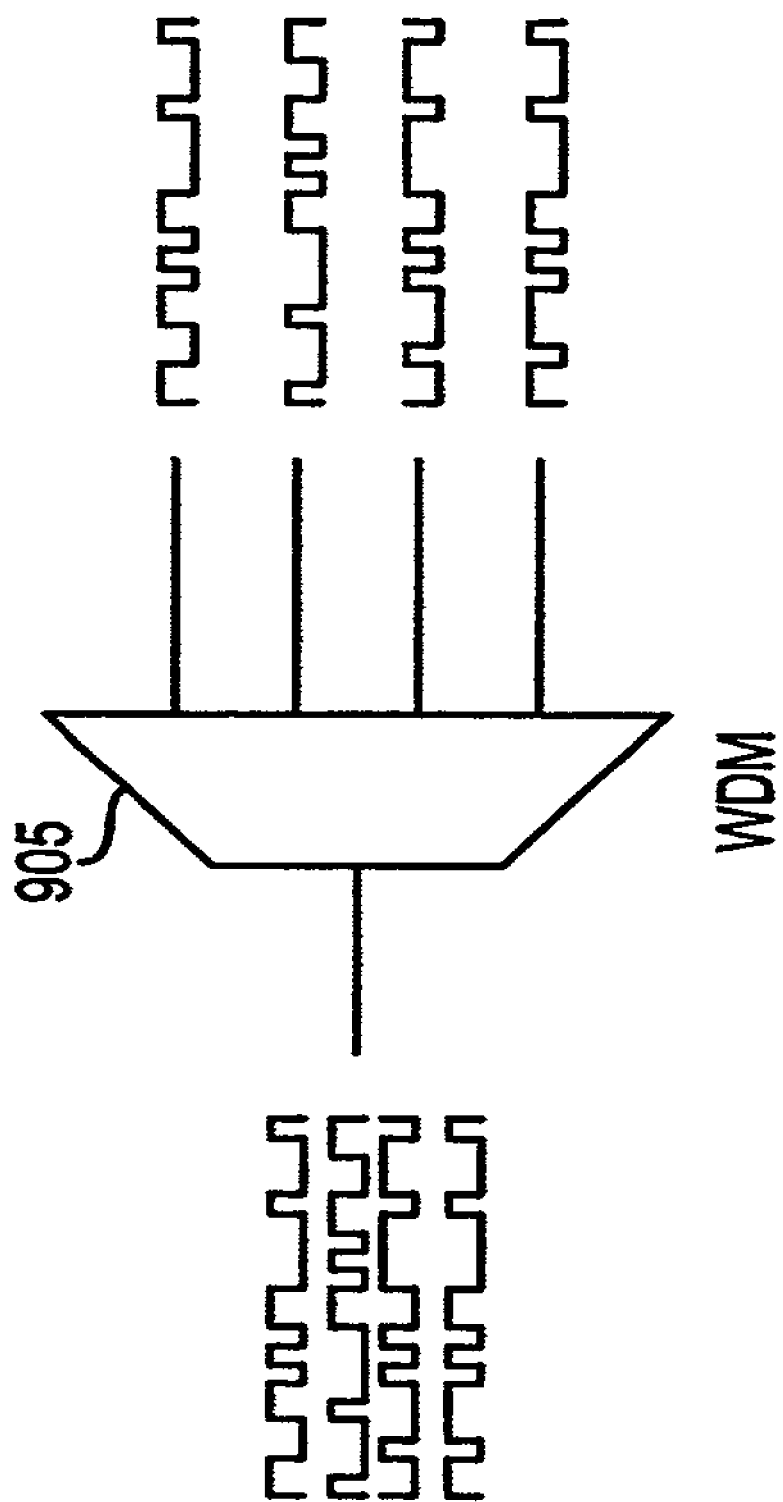
FIG. 8 is an alternative optical routing scheme.

FIG. 8 illustrates an alternative to the electrical distribution on the subtending system. The detector cloud could also, in principle, distribute the composite packet optically using a Wavelength Division Multiplexer (WDM) instead of using the FBGs. The composite packet enters the WDM 905 from the left and exits the WDM as individual wavelengths.

Figure 9:
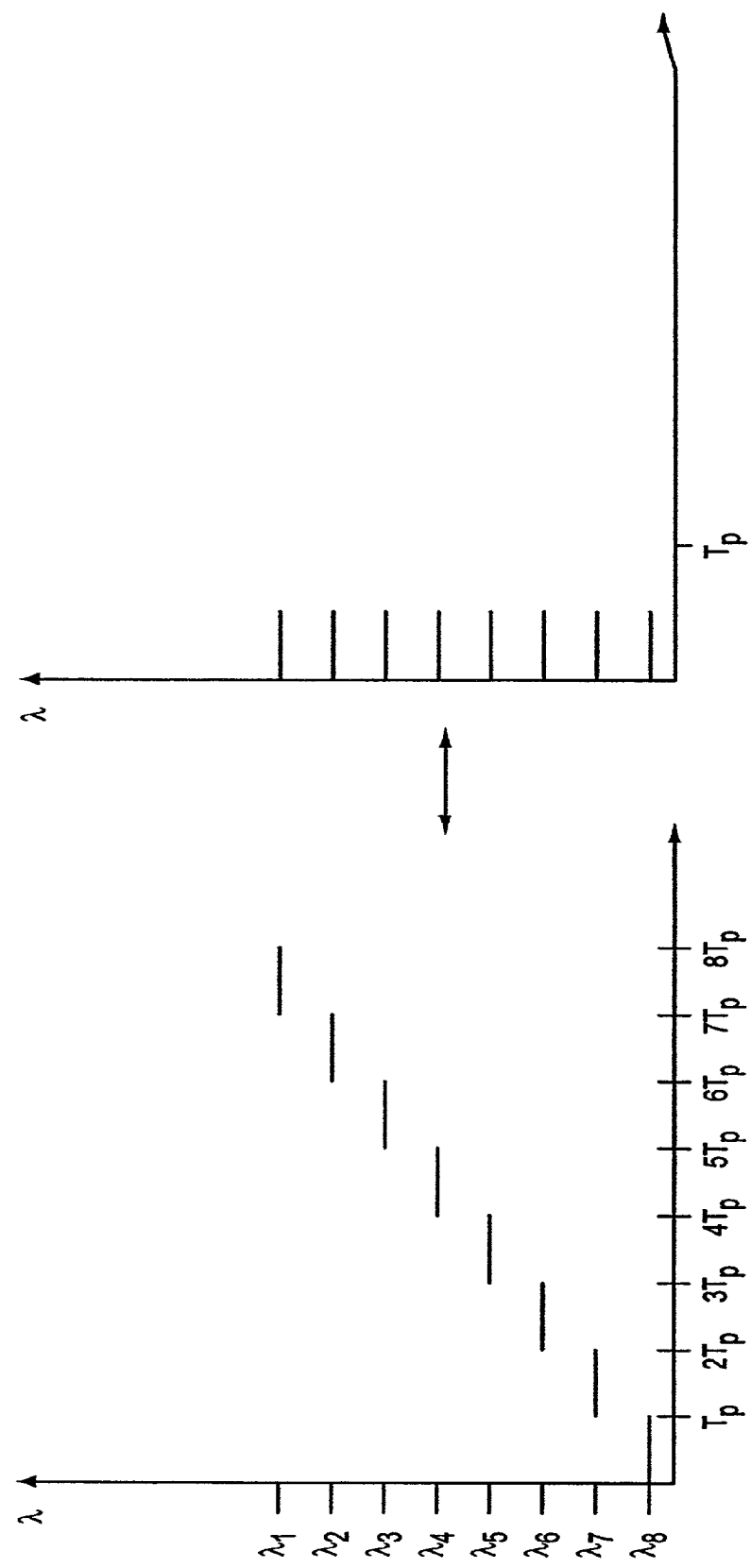
FIG. 9 further illustrates the stacking and unstacking concept.

FIG. 9 further illustrates the stacking and unstacking concepts of the present invention.

The graph on the left shows packets carried on different wavelengths generated in random order such that there is a set of serial packets. Note that in the example, eight different wavelengths are used. The graph on the right hand side of the figure shows the composite packet, which is in a single time slot and is stacked. The composite packet is formed by a serial-to-parallel conversion in time. That is, using passive techniques, the series of packets is converted in a composite packet, where the packets carried by different wavelengths coincide in time.

Figure 10:
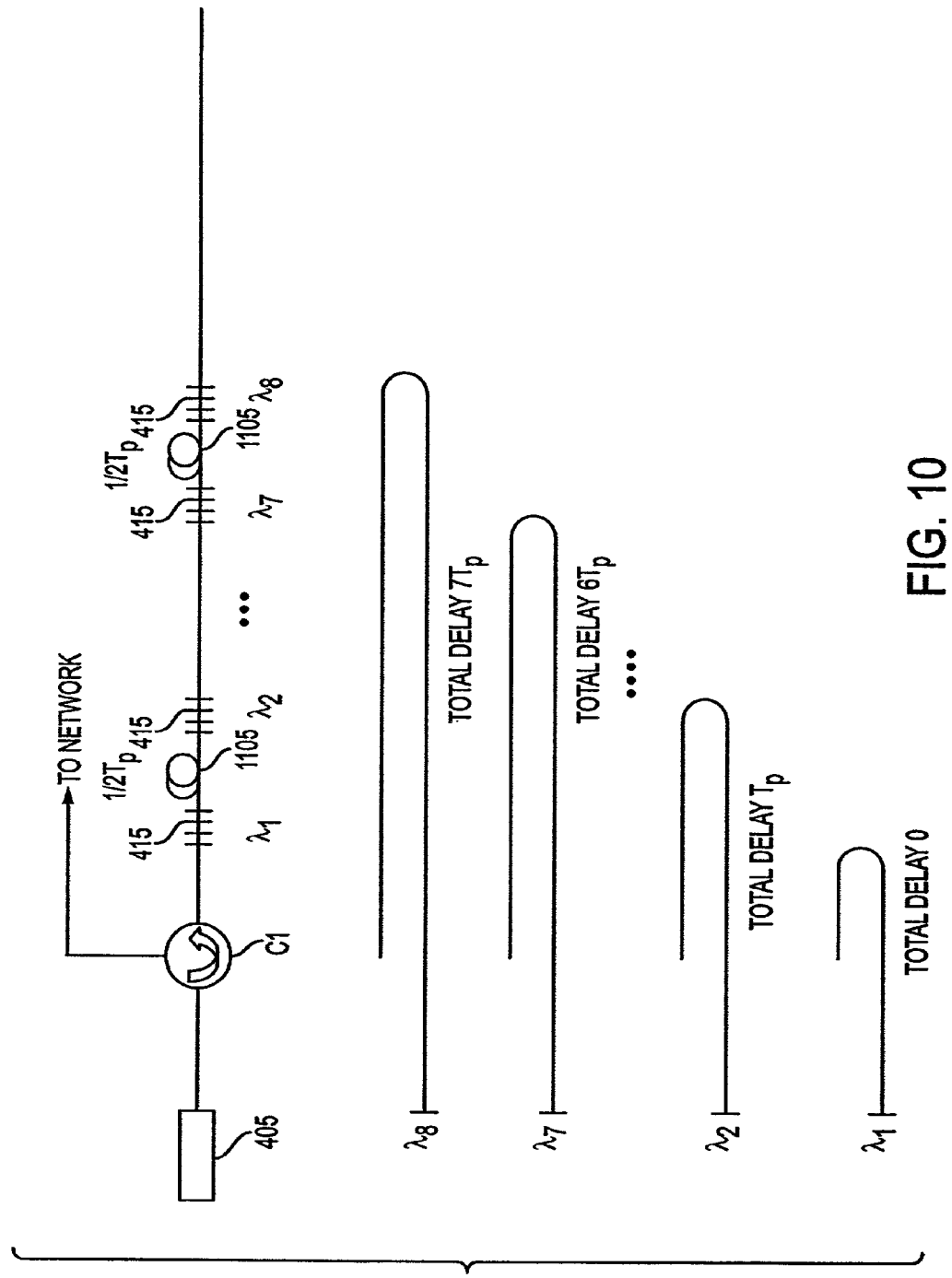
FIG. 10 shows an exemplary embodiment using fiber Bragg gratings as components of the stacker implementation.

FIG. 10 shows an exemplary embodiment using fiber Bragg gratings as components of the stacker implementation. As indicated in the description of FIG. 5, fiber Bragg gratings 415 each reflect one wavelength and are each spaced by $T_p/2$ from the adjacent FBG, so in the packet stacking process, there is a time delay 1105 between each wavelength. Wavelength $\lambda_8$ has the longest delay and is, thus, emitted first. Wavelength $\lambda_1$ has the shortest delay and is, thus, emitted last.

Figure 11:
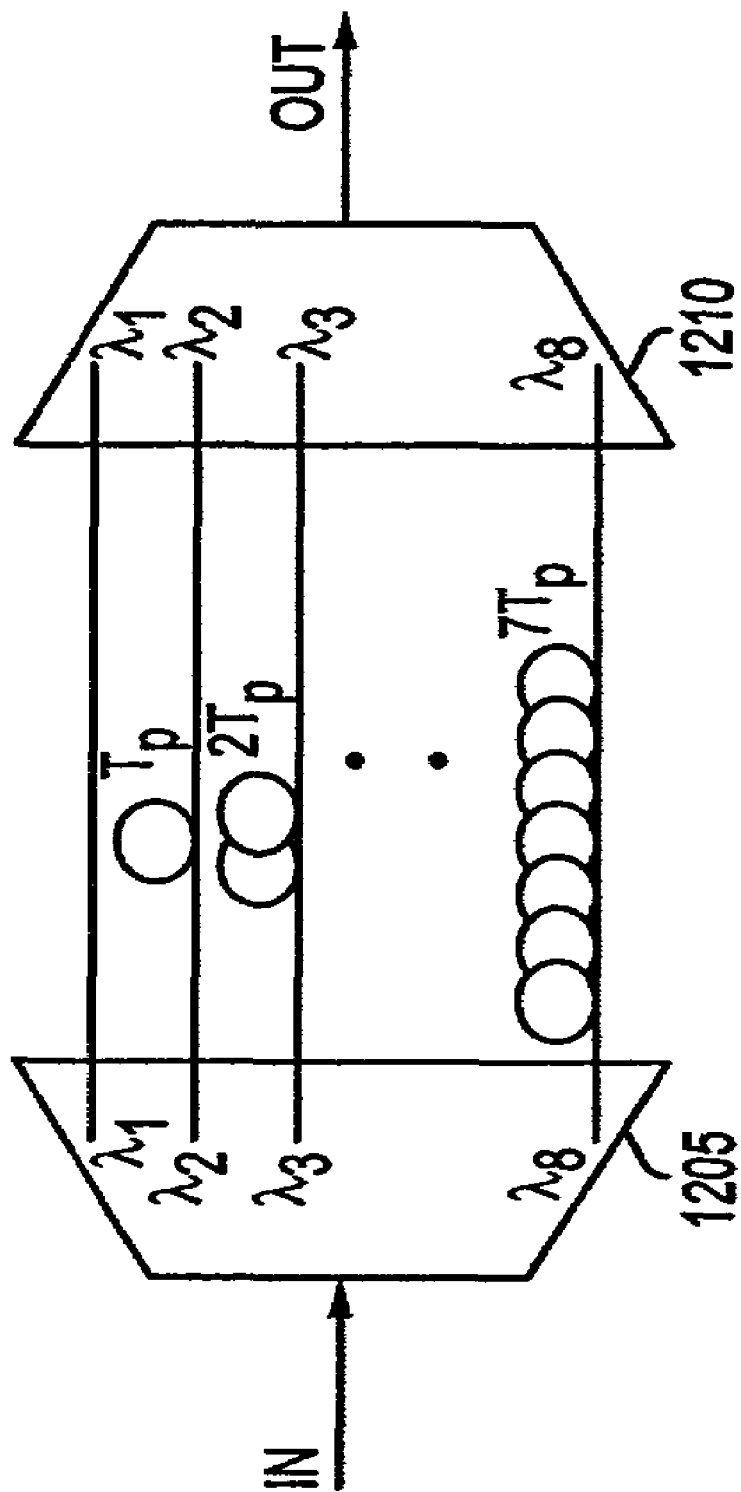
FIG. 11 depicts an alternative embodiment of the stacker/unstacker using Wavelength Division Multiplexers (WDMs)

FIG. 11 shows another embodiment of a stacker/unstacker combination using WDMs, such as Arrayed Waveguide Grating Routers (AWGRs). WDM 1205 accepts a serial stream of packets and converts the serial stream into a composite packet as output of WDM 1210.

Figure 12:
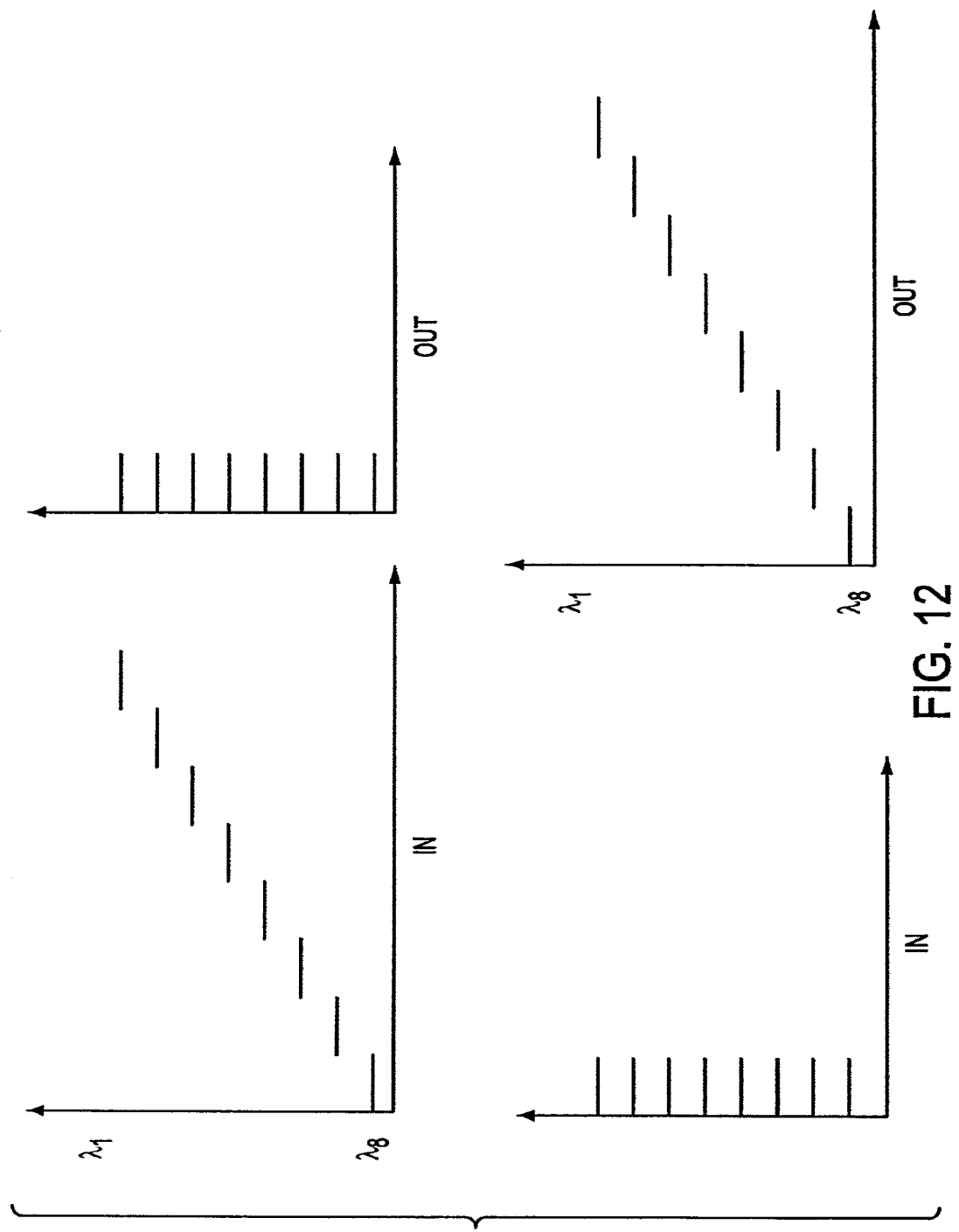
FIG. 12 graphically depicts the stacking and unstacking conceptually.

The top two graphs of FIG. 12 show a serial stream of packets generated in a stair step or staircase fashion on the left and the resulting composite packet on the right. That is, the top two graphs illustrate the stacking concept. The lower two graphs depict the unstacking concept with the graph on the left showing the composite packet and the graph on the right showing the unstacker serial stream of packets that are able to be further distributed.

FIG. 13a illustrates the use of a pair of WDMs with mirrors on each line for the stacking and unstacking. Immediately below the illustration of the diagram of the pair of WDMs is a graphical representation of the stacking and unstacking process conceptually. Circulator C1 accepts input from a tunable laser (not shown) consisting of a serial stream of packets. WDM 1405 accepts the input from circulator C1 and together with the mirror on each line accomplishes the stacking of the serial stream of packets to form a composite packet, which composite packet is then added to the core optical ring (network) via the output line from circulator C1. Circulator C2 accepts input from the network consisting of a composite packet. WDM 1410 accepts the input from circulator C2 and together with the mirror on each line accomplishes the parallel-to-serial conversion to form a serial stream of packets for further distribution on the subtending ring (not shown) via the output line.

FIG. 13b is a graph depicting a serial stream of packets generated in a staircase or stair step fashion by a tunable laser (not shown). FIG. 13c is a graph of the composite packet labeled Out/In. This composite packet, which is in a single time slot, represents the output of the stacker as well as the input to the unstacker. FIG. 13d is a representation of the serial stream of packets, which is the result of the unstacking process.

Figure 14B:
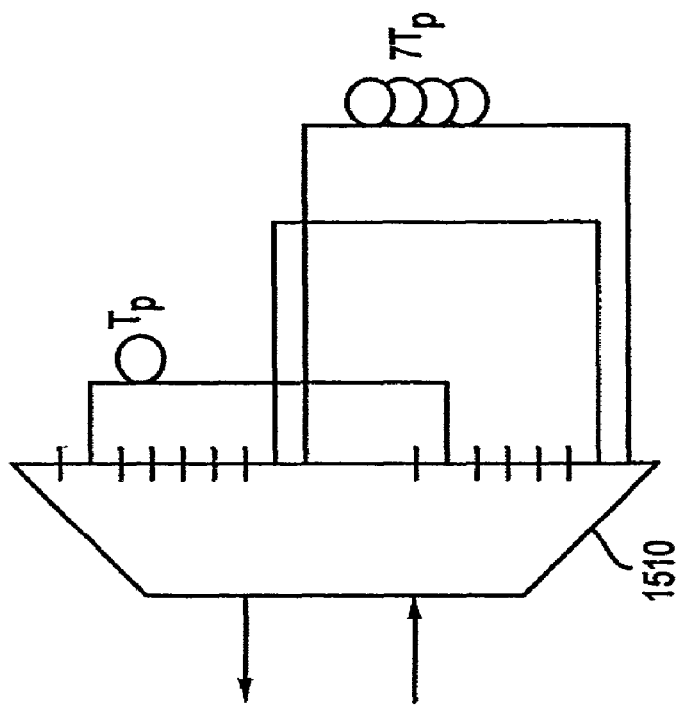
FIG. 14b is an implementation of an unstacker using a single 2×2N switch.
Figure 14A:
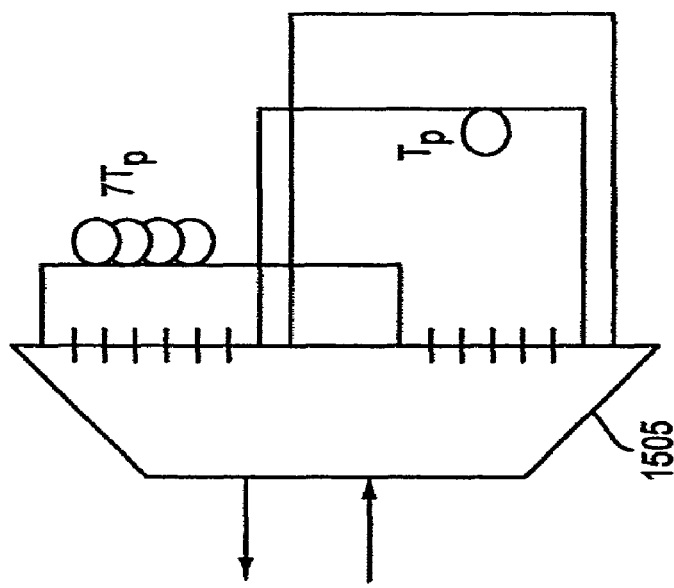
FIG. 14a is an embodiment of a stacker using a single 2×2N switch.

FIG. 14a is an embodiment of a stacker using the routing properties of an Arrayed Waveguide Grating (AWG). FIG. 14b is an implementation of an unstacker using the routing properties of an AWG. The stacker and the unstacker are shown implemented as separate units. WDM 1505 accepts input consisting of a serial stream of packets generated by a tunable laser (not shown). WDM 1505 forms a composite packet by using the WDM itself to stack the serial packets. The composite packet is output to the core optical ring (network). WDM 1510 accepts input from the network consisting of a composite packet. WDM 1510 forms a serial stream of packets by using itself to unstack the composite packet. The serial stream of packets is further distributed on the subtending ring (not shown). The properties of an AWG are well-known to those skilled in the art. (See, C. Dragone, "*An NxN Optical Multiplexer Using a Planar Arrangement of Two Star Couplers*," IEEE Photon Tech. Lett., Vol 3, pp 812–815, 1991 and C. Dragone, C. A. Edwards, R. C. Kiestler, "*Integrated Optics NxN Multiplexer On Silicon*," IEEE Photon Tech. Lett., Vol 3, pp 896–899, 1991.)

Figure 15B:
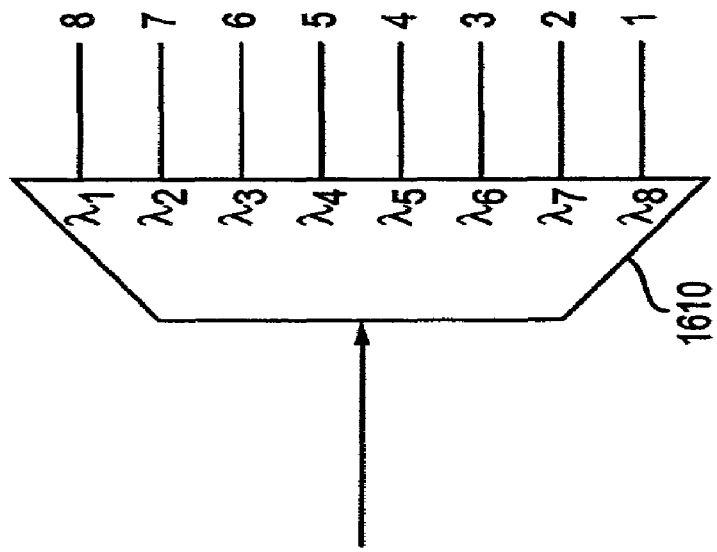
FIG. 15b depicts an unstacker using a WDM.
Figure 15A:
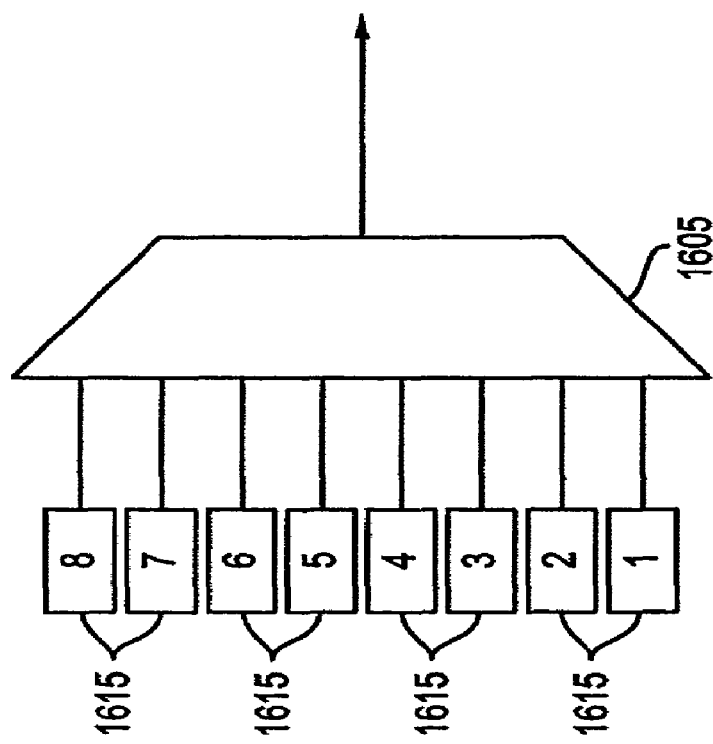
FIG. 15a is another embodiment of a stacker using an array of Distributed Feedback Lasers (DFBs)

FIG. 15a is another embodiment of a stacker using an array of Distributed Feedback Lasers (DFBs) 1605. The composite packet is generated in parallel so that no serial-to-parallel to conversion is required because the DFB produces the composite packet in parallel. That is, the stacker operates in parallel in this exemplary embodiment. The composite packet is output to the network. The streams of packets are generated by tunable lasers 1615. Similarly, FIG. 15b uses a WDM 1610 to accept a composite packet from the core optical ring. WDM 1610 then demultiplexes the composite packet outputting the serial stream of packets for distribution on the subtending system. That is, the unstacker's operation would be parallel in this exemplary embodiment.

Figure 16:
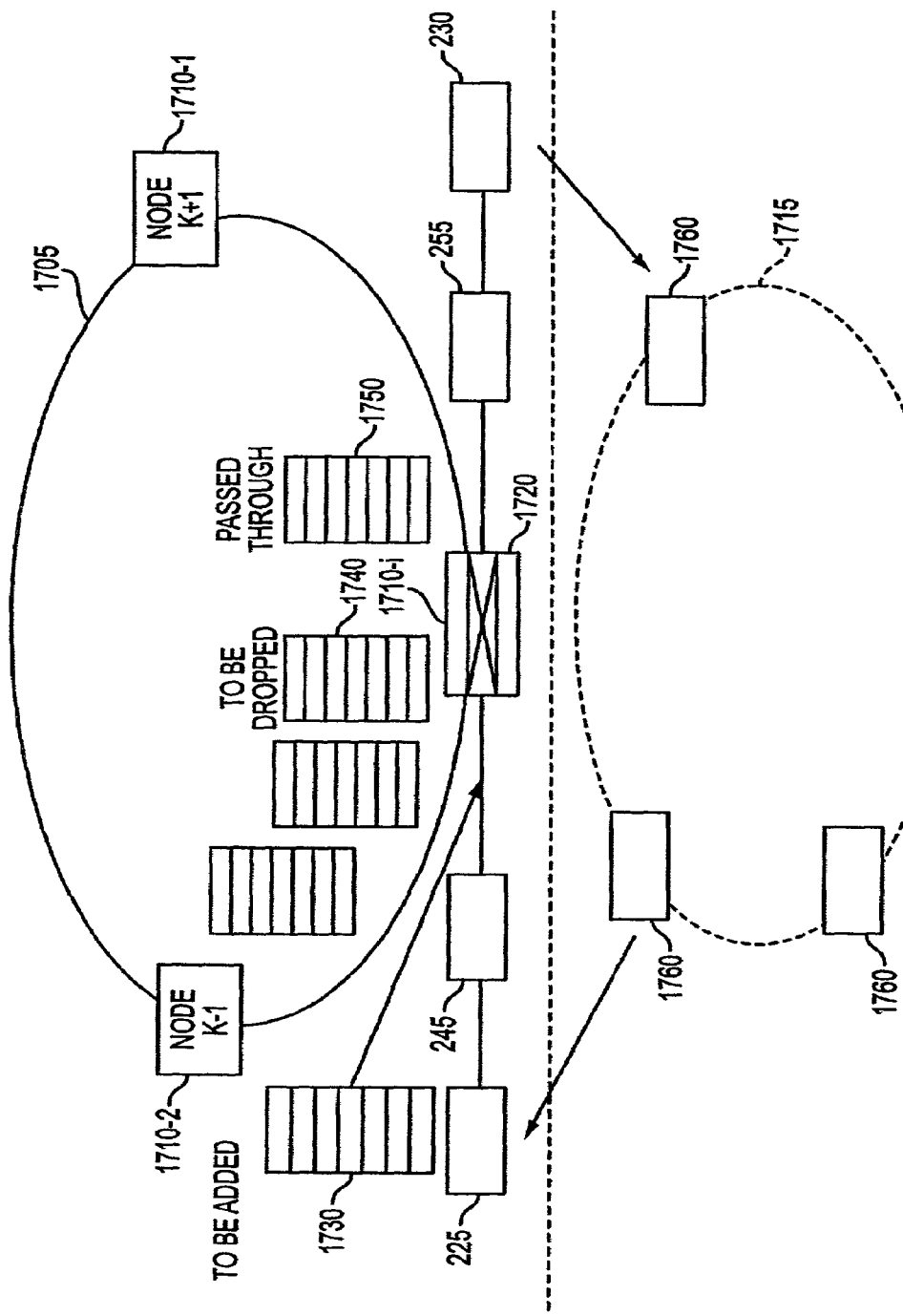
FIG. 16 illustrates the possibilities facing a composite packet in the composite packet photonic slot routing architecture of the present invention.

FIG. 16 illustrates the possibilities facing a composite packet in the composite packet photonic slot routing architecture of the present invention. A composite packet approaching a node on a core optical ring may be dropped or "passed through" to a further node. A composite packet may be added. FIG. 16 illustrates core optical ring (network) 1705 having a plurality of nodes 1710-1, 1710-2, ..., 1710-i and a switch 1720, which is a part of node 1710-i. Subtending system 1715 is coupled to core optical ring 1705 by a switch 1720, which is depicted herein as a 2×2 switch but which may be a n×n switch. Also illustrated are a plurality of composite packets. Information contained in packets comprising composite packet 1730 was generated by a node 1760 of the subtending system 1715 and forwarded to tunable laser 225, which generates a serial stream of packets. Stacker 245 stacks the serial stream of packets to form composite packet 1730. Correspondingly, information destined for a node 1760 on subtending system 1715 is communicated as a serial stream of packets (unstacked by unstacker 255) from receiver 230. Composite packet 1730 is illustrated, as it is constituted after stacking by stacker 245, so the dotted arrow line points to the line connecting the stacker to switch 1720. Composite packet 1740 is propagating on the core optical ring 1705 and is to be dropped at subtending system 1715 to be further distributed on the subtending system.

Composite packet 1750 is another composite packet that is propagating on the core optical ring 1705 and is not destined for any node on subtending system 1715 so is to "bypass" the subtending system or to "pass through" the node for the subtending system.

Bypassing and passing through are two similar techniques for permitting a composite packet to continue propagating on the core optical ring 1705 until the composite packet is to be dropped at a destination on another subtending system.

Figure 17:
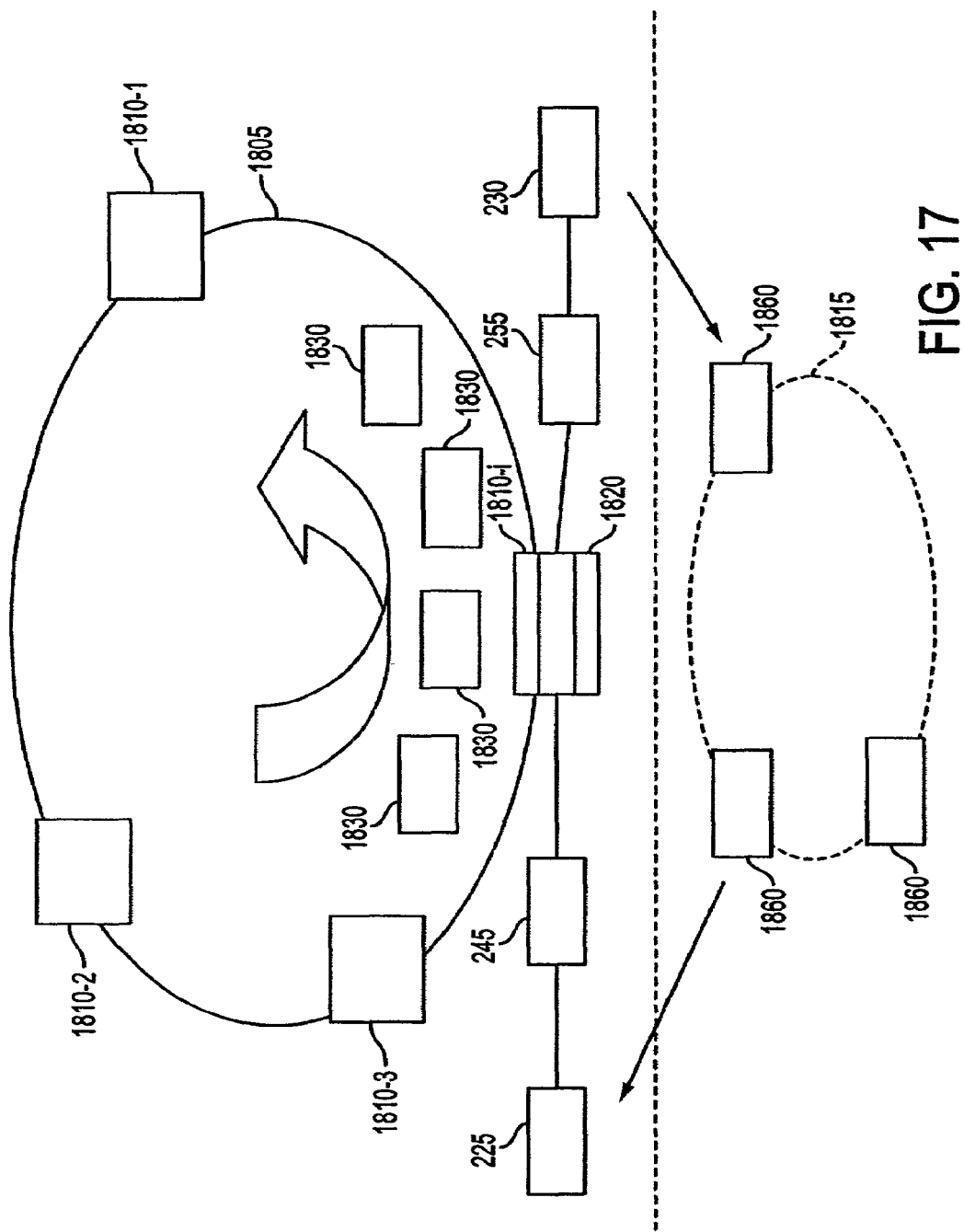
FIG. 17 is a view of the switch that couples the core optical ring to a subtending ring in the "pass through" situation.

FIG. 17 is a view of the switch state that couples the core optical ring 1805 to a subtending system in the "pass through" situation. Core optical ring 1805 has a plurality of nodes 1810-1, 1810-2, ..., 1810-i and is coupled to subtending system 1815 by a switch 1820, which is part of node 1810-i. Composite packets 1830 propagating on core optical ring 1805 are to be "passed through" as they are not destined for any node 1860 on the subtending system 1815. Switch 1820 is depicted as a 2×2 switch but may be a n×n switch. Composite packets 1830 are "passed through" by switching the 2×2 switch to the bar state. Node 1810-i comprises switch 1820, tunable laser 225, stacker 245, unstacker 255 and receiver 230.

Figure 18:
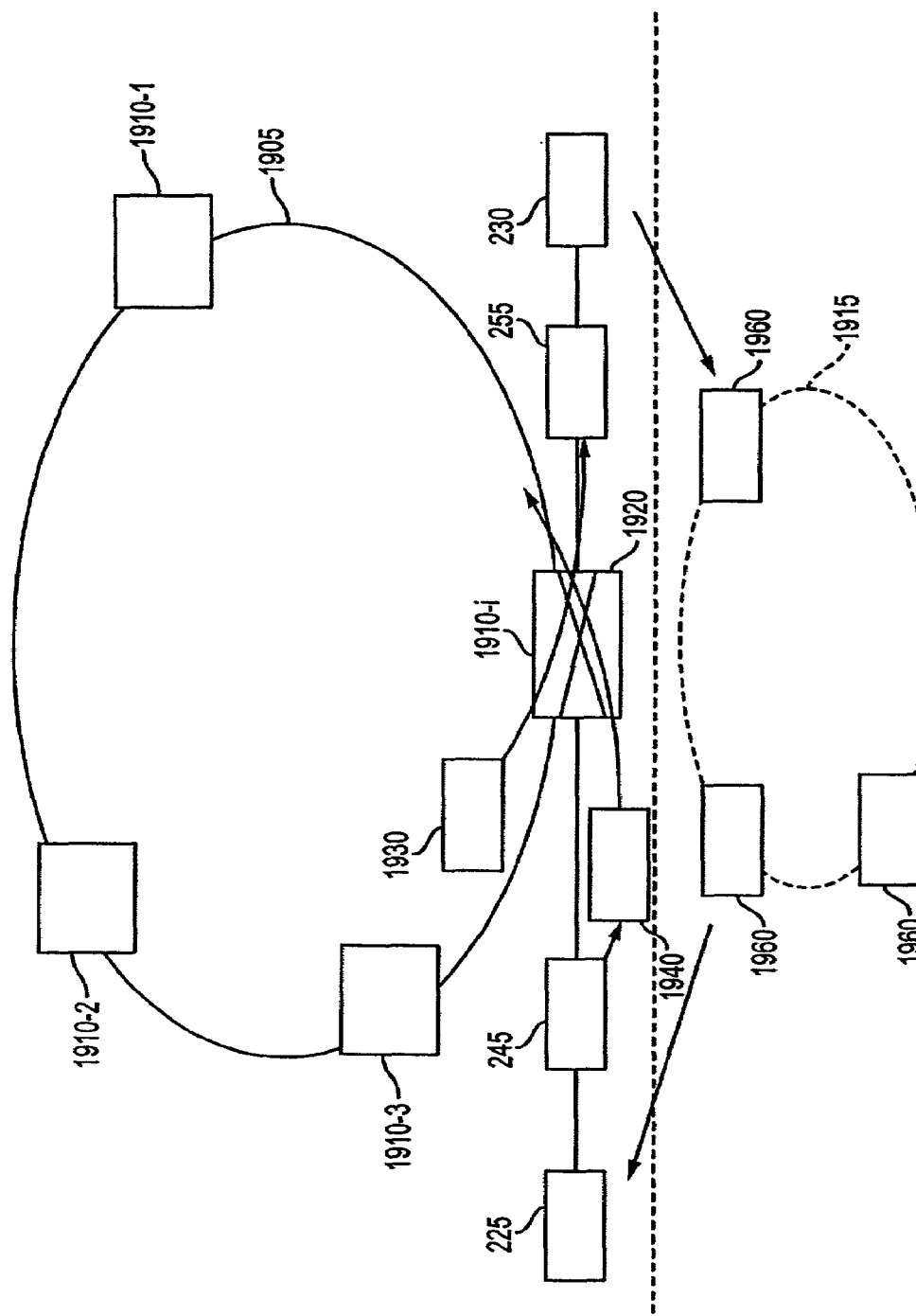
FIG. 18 is a view of the switch that couples the core optical ring to a subtending ring in the add/drop situation.

FIG. 18 is a view of the switch state that couples the core optical ring 1905 to a subtending system in the add/drop situation. Packets propagating on core optical ring 1905 which has a plurality of nodes 1910-1, 1910-2, ..., 1910-i) are coupled to subtending system 1915 by a switch 1920, which is part of node 1910-i. Switch 1920 is depicted as a 2×2 switch but may be a n×n switch. Composite packet 1930 propagating on core optical ring 1905 is to be dropped at subtending system 1915. Information contained in packets comprising composite packet 1940 was generated by a node 1960 of the subtending system 1915 and forwarded to tunable laser 225, which generates a serial stream of packets. Stacker 245 stacks the serial stream of packets to form composite packet 1940. Correspondingly, information destined for a node 1960 on subtending system 1915 is communicated as a serial stream of packets (unstacked by unstacker 255) from receiver 230. Composite packet 1940 is illustrated, as it is constituted after stacking by stacker 245, so the arrow line points to the line connecting the stacker to switch 1920.

The switch 1920 is switched to the cross state allowing composite packet 1930 to be dropped from the core optical ring 1905 and composite packet 1940 to be added to the core optical ring 1905 in an empty or vacant photonic time slot. Node 1910-i comprises switch 1920, tunable laser 225, stacker 245, unstacker 255 and receiver 230.

Figure 19:
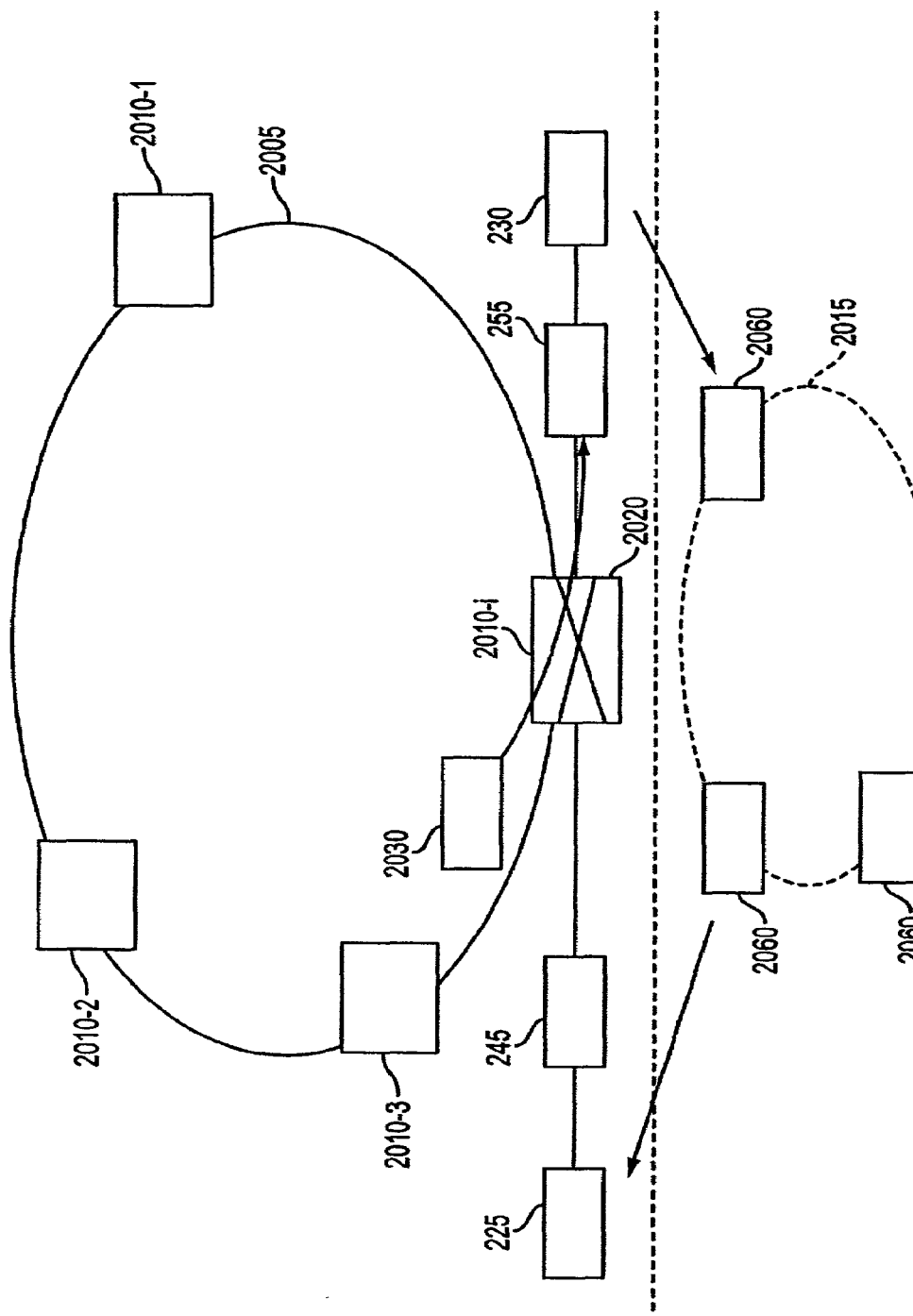
FIG. 19 is a view of the switch that couples the core optical ring to a subtending ring in the drop and leave a slot empty situation.

FIG. 19 is a view of the switch state that couples the core optical ring 2005 to a subtending system 2015 in the "drop and leave a slot empty" situation. Core optical ring 2005 has a plurality of nodes 2010-1, 2010-2, ..., 2010-i and is coupled to subtending system 2015 by a switch 2020, which is part of node 2010-i. Switch 2020 is depicted as a 2×2 switch but may be a n×n switch. Composite packet 2030 propagating on core optical ring 2005 is to be dropped at subtending system 2015. The switch 2020 is switched to the cross state allowing composite packet 2030 to be dropped from the core optical ring 2005 and leaving an empty or vacant photonic time slot because no composite packets are to be added at this instant. Node 2010-i comprises switch 2020, tunable laser 225, stacker 245, unstacker 255 and receiver 230. Information destined for core optical ring 2005 is generated by a node 2060 on subtending system 2015 and is forwarded to tunable laser 225. Information destined for a node 2060 on subtending system 2015 from core optical ring 2005 is communicated to subtending system 2015 from receiver 230.

Figure 20:
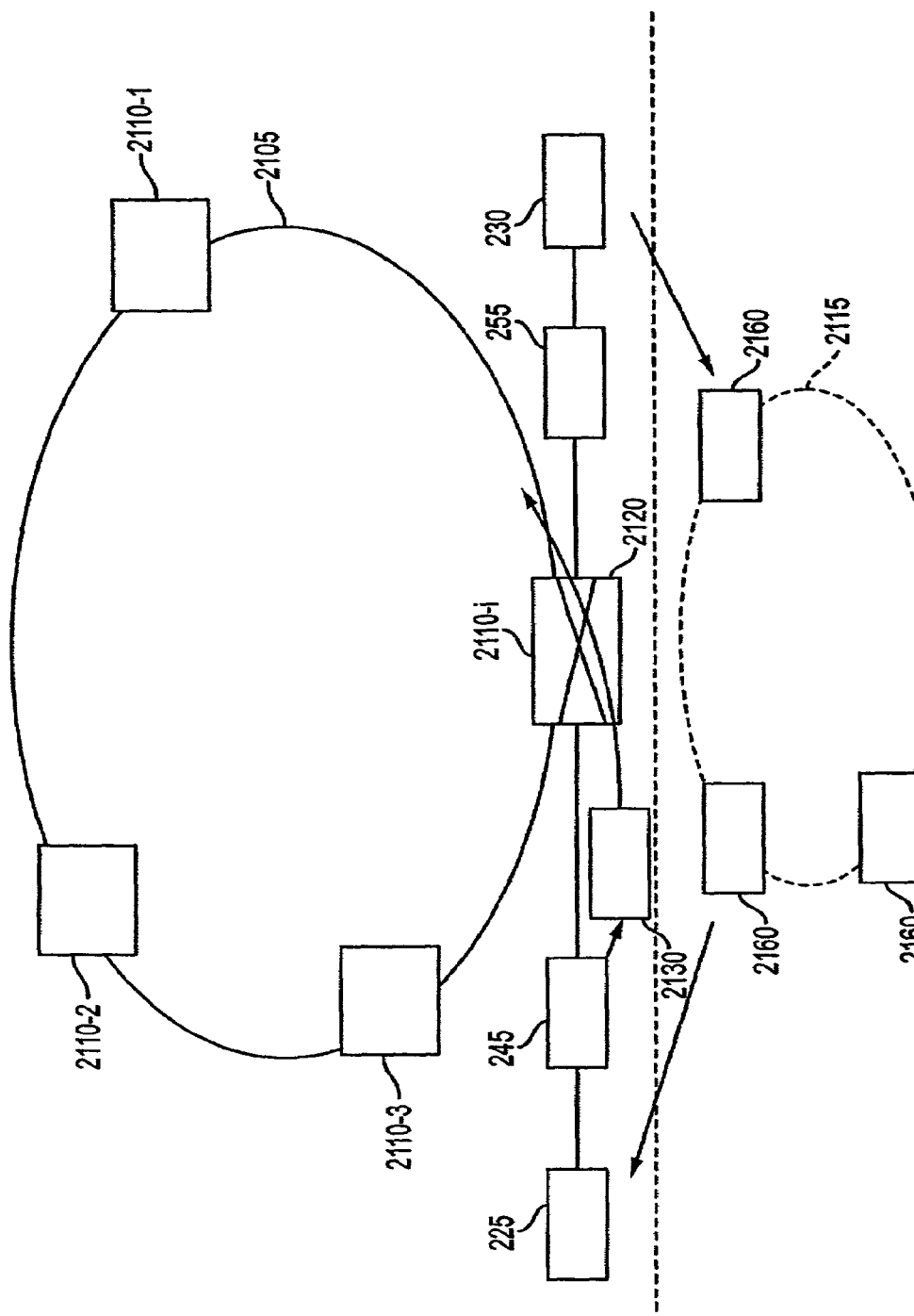
FIG. 20 is a view of the switch that couples the core optical ring to a subtending ring in the situation when a composite packet needs to be added to an empty photonic slot.

FIG. 20 is a view of the switch state that couples the core optical ring 2105 to a subtending system 2115 in the situation when a composite packet needs to be added to an empty photonic slot. Core optical ring 2105 has a plurality of nodes 2110-1, 2110-2, ..., 2110-i and is coupled to subtending system 2115 by a switch 2120, which is part of node 2110-i. Switch 2120 is depicted as a 2×2 switch but may be a n×n switch. Information contained in packets comprising composite packet 2130 was generated by a node 2160 of the subtending system 2115 and forwarded to tunable laser 225, which generates a serial stream of packets. Stacker 245 stacks the serial stream of packets to form composite packet 2130. Correspondingly, information destined for a node 2160 on subtending system 2115 is communicated as a serial stream of packets (unstacked by unstacker 255) from receiver 230. Composite packet 2130 is illustrated, as it is constituted after stacking by stacker 245, so the arrow line points to the line connecting the stacker to switch 2120.

The switch 2120 is switched to the cross state allowing composite packet 2130 to be added to the core optical ring 2105 in an empty or vacant photonic time slot. Node 2110-i comprises switch 2120, tunable laser 225, stacker 225, unstacker 255 and receiver 230.

Transparent bypass is a technique that allows the addition of and/or dropping of a portion of a composite packet without affecting the balance of the composite packet. Any node can be adding or dropping a portion of a composite packet while leaving the remainder of the composite packet intact. In the prior art, wavelengths not dropped in a subtending ring would have to travel all the way around the subtending ring incurring all of the associated losses.

Figure 21:
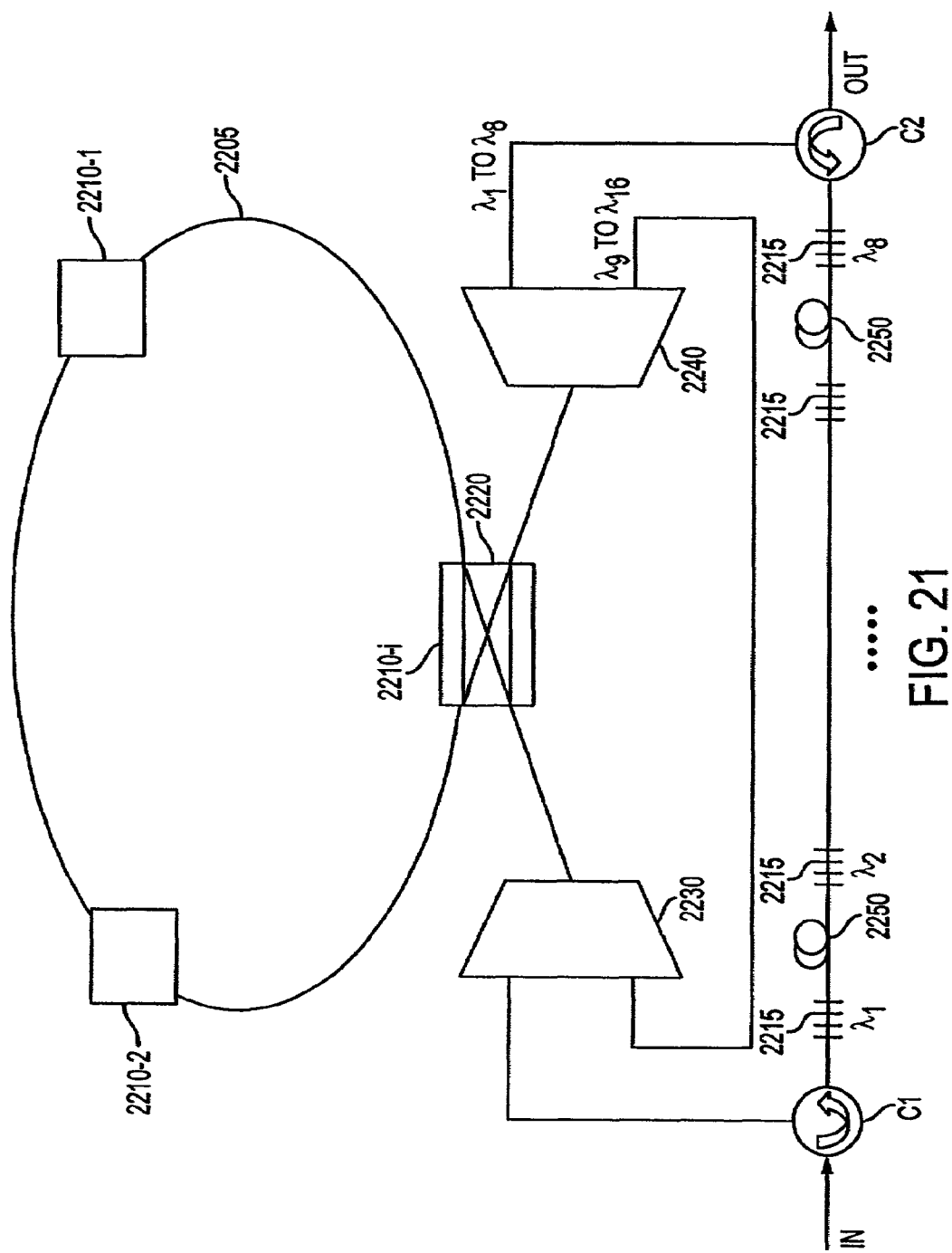
FIG. 21 depicts an embodiment of the concept of transparent bypass.
Figure 22:
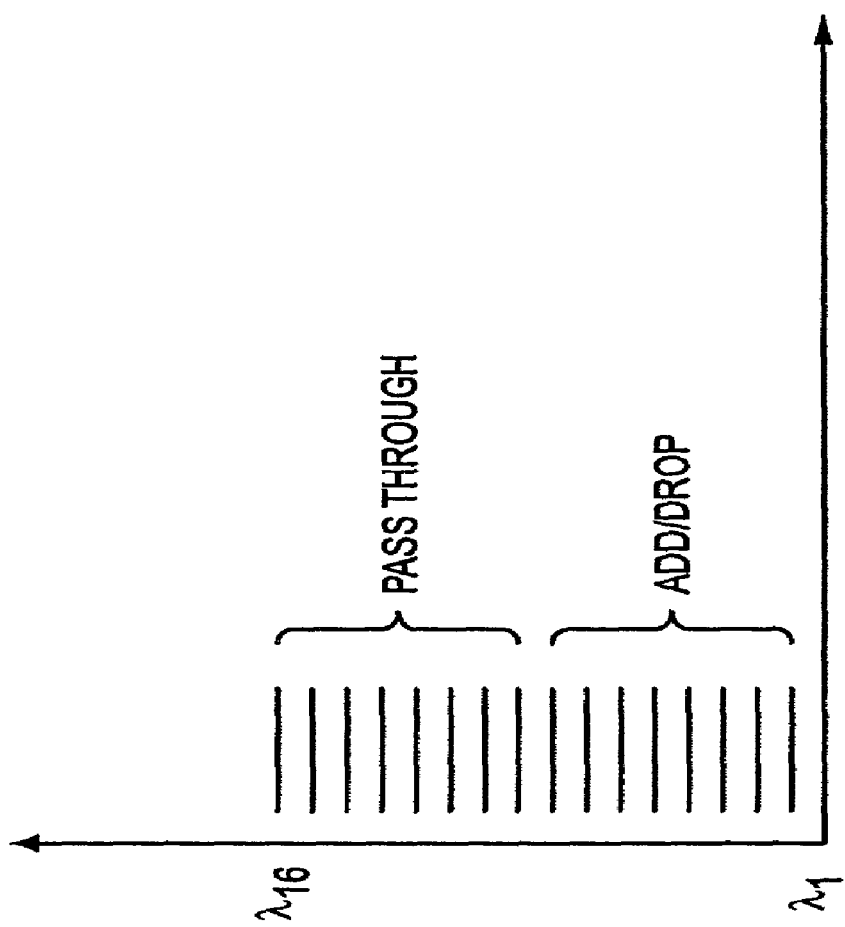
FIG. 22 depicts the composite packet indicating the wavelengths that are passed through and those wavelengths that are to added and/or dropped.

FIG. 21 depicts an embodiment of the concept of transparent bypass, where a first portion of the composite packet can be distributed to a destination, for example, on the subtending system and a second portion of the composite packet can be routed back onto the core optical ring. The portion of the composite packet that is routed back onto the core optical ring may be interleaved with portions of a composite packet created by the stacker from input from a tunable laser or other source of a serial stream of packets. FIG. 21 is the most straightforward implementation of the transparent bypass technique. Core optical ring 2205 has a plurality of nodes 2210-1, 2210-2, . . . , 2210-i and a switch 2220, which is part of node 2210-i. Switch 2220 is depicted as a 2×2 switch but it may be a n×n switch. In an exemplary instance, wavelengths $\lambda_1$ to $\lambda_8$ are to be dropped and/or packets are to be added to vacant slots in the composite packet in this range. Wavelengths $\lambda_9$ to $\lambda_{16}$ are to be transparently bypassed. The switch 2220 is in the cross position and a composite packet is dropped to WDM 2240. Wavelengths $\lambda_9$ to $\lambda_{16}$ are routed to WDM 2230 and output back to the core optical ring through the switch in cross state. Wavelengths $\lambda_1$ to $\lambda_8$ are routed to circulator C2 and thereafter through the fiber Bragg gratings 2215 and time delays 2250 and the packets that are to be further distributed on the subtending system are output from circulator C2. A serial stream of packets generated by a tunable laser (not shown) is accepted as input by circulator C1. Circulator C1 in combination with the fiber Bragg gratings transforms the serial stream of packets generated by a tunable laser (not shown) into a composite packet, which is interleaved with any packets in the wavelength range $\lambda_1$ to $\lambda_8$ that are vacant slots. FIG. 22 depicts the composite packet indicating the wavelengths that are passed through and those wavelengths that are to added and/or dropped.

Figure 23:
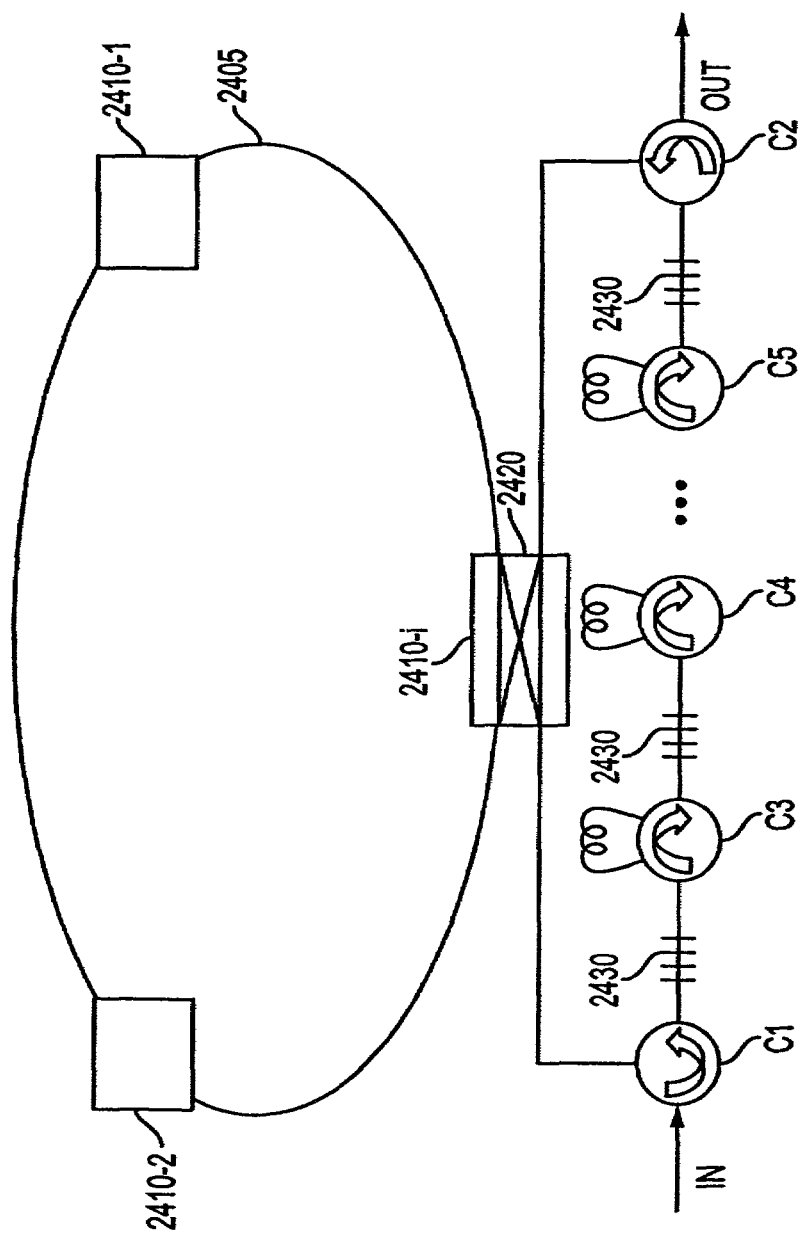
FIG. 23 illustrates an alternative embodiment of the transparent bypass technique.

FIG. 23 illustrates an alternative embodiment of the transparent bypass technique in which the composite parent goes through the stacker in order the switch output to input. Core optical ring 2405 has a plurality of nodes 2410-1, 2410-2, . . . , 2410-i and a switch 2420, which is part of node 2410-i. The transparent bypass technique in this embodiment uses a plurality of three-port circulators C1 and C2 and four-port circulators C3, C4 and C5 and fiber Bragg gratings 2430. A disadvantage of this embodiment is cross-talk, which can be reduced or eliminated using well known switch dilation techniques.

Figure 24:
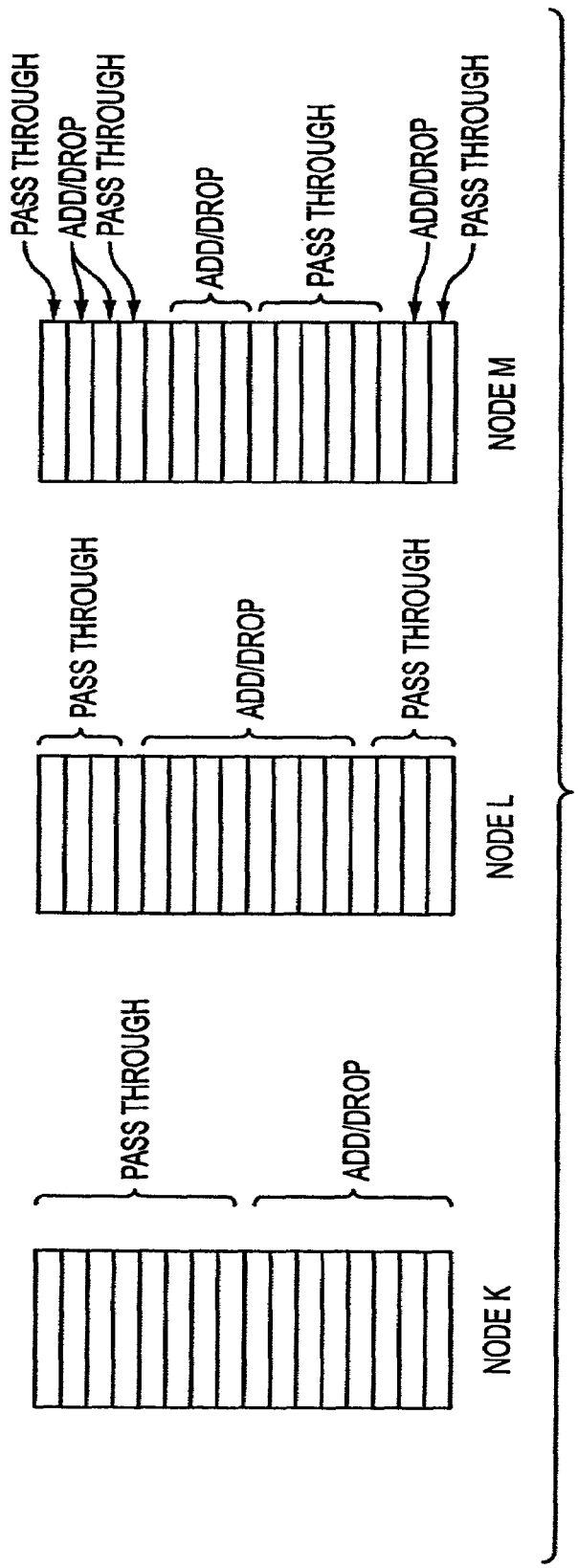
FIG. 24 shows the channel allocation of several nodes.

FIG. 24 shows the channel allocation of several nodes. The channel allocations for node K indicate that the upper wavelength range is passed through and the lower wavelength range is subject to add/drop. In node L the channel allocation indicates that the central wavelength range is add/drop and the wavelength range at both the top and the bottom is passed through. In node M the channel allocation is uniquely defined.

Figure 25:
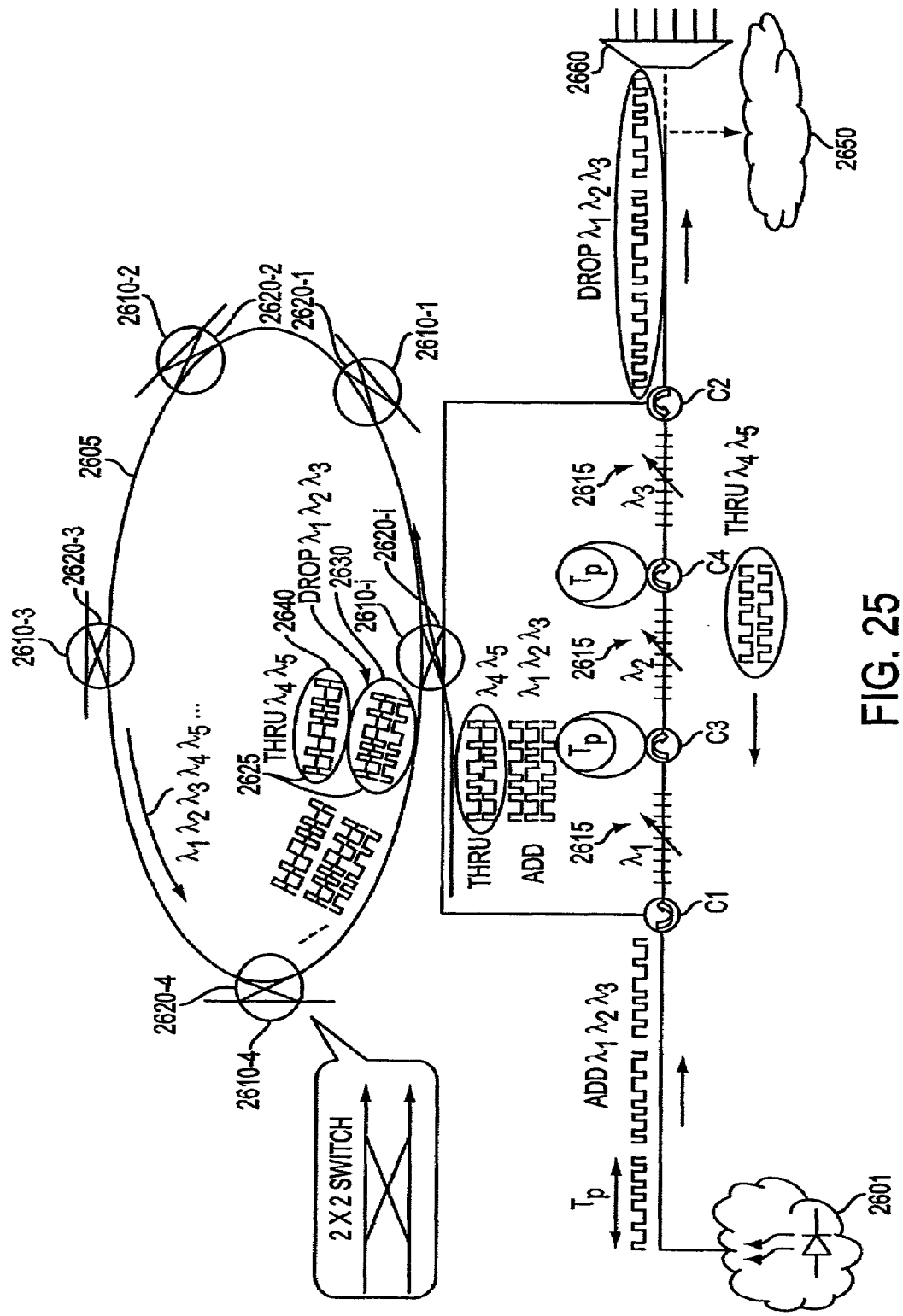
FIG. 25 is a more detailed illustration of the embodiment of the transparent bypass technique presented in FIG. 24.

FIG. 25 is a more detailed illustration of the embodiment of the transparent bypass technique presented in FIG. 24. Core optical ring 2605 has a plurality of nodes 2610-1, 2610-2, . . . , 2610-i with corresponding switches 2620-1, 2620-2, . . . , 2620-i, which are part of their corresponding nodes. The transparent bypass technique in this embodiment uses a plurality of three-port circulators C1 and C2 and four-port circulators C3 and C4 and fiber Bragg gratings 2615. Tunable laser 2601 generates a serial stream of packets to be stacked and added to the core optical ring 2605. In advance of approaching each node, a determination is made for each composite packet whether it is to be dropped or whether it is to pass through the node or any portion thereof is to be dropped or to be passed through the node. In the example in FIG. 25, composite packet 2625 consists of composite packet portion 2630, which is to be dropped, and composite packet portion 2640, which is to be passed through the node. Composite packet portion 2630 consists of a plurality of packets of wavelengths $\lambda_1$, $\lambda_2$ and $\lambda_3$ and composite packet portion 2640 consists of a plurality of packets of wavelengths $\lambda_4$ and $\lambda_5$. The switch for the node in the exploded view is put into the cross state. Both composite packet portions 2630 and 2640 are dropped. Since the fiber Bragg gratings 2615 only reflect wavelengths $\lambda_1$, $\lambda_2$ and $\lambda_3$, composite packet portion 2630 is dropped and unstacked for further routing by detector 2650 or WDM 2660. Composite packet portion 2640 transparently bypasses or travels through the electronics and is interleaved with the now stacked packets generated by tunable laser 2601, whereupon the composite packet portion 2640 re-enters core optical ring 2605 along with the new composite packet generated at the node in the exploded view. That is, those 'thru' composite packets are added to the ring together with the part of the composite packet stack generated at the node by the tunable laser source 2601. This provides an increased bandwidth re-utilization capability to the network 2605, since the set of wavelengths used in the network can be significantly larger than that covered by any given laser source's tuning range. This novel and non-obvious transparent packet-switching scheme improves ring performance by increasing the number of wavelengths available on the ring over the number of wavelengths available at the nodes. The cost is two more four-port circulators and the associated delay lines. The forward delay is $T_p$ and there is no delay on reflection. This novel and non-obvious implementation increase bandwidth utilization and simplifies scheduling.

Yet another advantage of the present invention is the possible degrees of flexibility. The photonic slot routing algorithm of the present invention also allows for Time Slot Interchange (TSI), which is normally performed electronically. In a fiber Bragg grating embodiment, TSI is performed by interchanging the order of the fiber Bragg gratings in the stacker relative to the unstacker. In an embodiment that uses WDMs, TSI is accomplished by interchanging the order of the fiber delay lines. The use of a tunable stacker/unstacker provides additional flexibility. If the fiber Bragg gratings are widely tunable, then the highest order of reconfigurability is insured because $\lambda_i$ can be tuned to $\lambda_j$ and vice versa. This process is identical to physically exchanging the wavelengths.

Another method for making stacking and unstacking reconfigureable is to exchange delay lines for different wavelengths. Such flexibility is provided by using a reconfigureable unstacker such as depicted in FIG. 26a. Here a switching matrix is interposed between a WDM and a set of delay lines. The switchable paths in the switch are represented by dashed lines. By programming the switch, one can associate a delay line with a wavelength. In FIG. 26a, a 4×4 switch defines the delay of each wavelength. This effectively alters the unstacking order. That is, the wavelengths can be unstacked in any arbitrary order. Viewing the four ports on the left hand side of the WDM as 1–4 in order from top to bottom will result in the incoming composite packet being unstacked in the following order $\lambda_3$, $\lambda_1$, $\lambda_4$ and $\lambda_2$. The composite packet arrives stacked from the network and is unstacked in any arbitrary order using a circulator, a WDM and the 4×4 switch. The switch depicted here is 4×4 but the switch may be n×n.

If the fiber Bragg gratings are not widely tunable, then a reconfigureable and tunable stacker/unstacker as depicted in FIG. 26b can be used. A switch can be used to change the order of the fiber Bragg gratings in the stacker/unstacker. The solid lines represent a permanent connection and the dashed lines represent switchable connections. In an exemplary embodiment a reconfigureable and tunable stacker/unstacker can be implemented using a 5×5 switch and a plurality of fiber Bragg gratings. The composite packet arrives stacked from the network and is unstacked in any arbitrary order using circulators, the 5×5 switch and a plurality of fiber Bragg gratings. Following the signal coming into the left circulator (to be stacked), the first grating will be the $\lambda_1$ grating followed by a delay line, then the $\lambda_4$ grating and then another delay line, followed by the $\lambda_3$ grating and another delay line, and the $\lambda_2$ grating and a final delay line. Alternatively, for a composite packet entering from the right circulator (from the network and to be unstacked) the packet will be unstacked in the following order $\lambda_2$, $\lambda_3$, $\lambda_4$ and $\lambda_1$. The switch depicted here is 5×5 but may be n+1×n+1, where n is the number of wavelengths. The dashed lines denote the reconfigureable optical switch connections.

Figure 27:
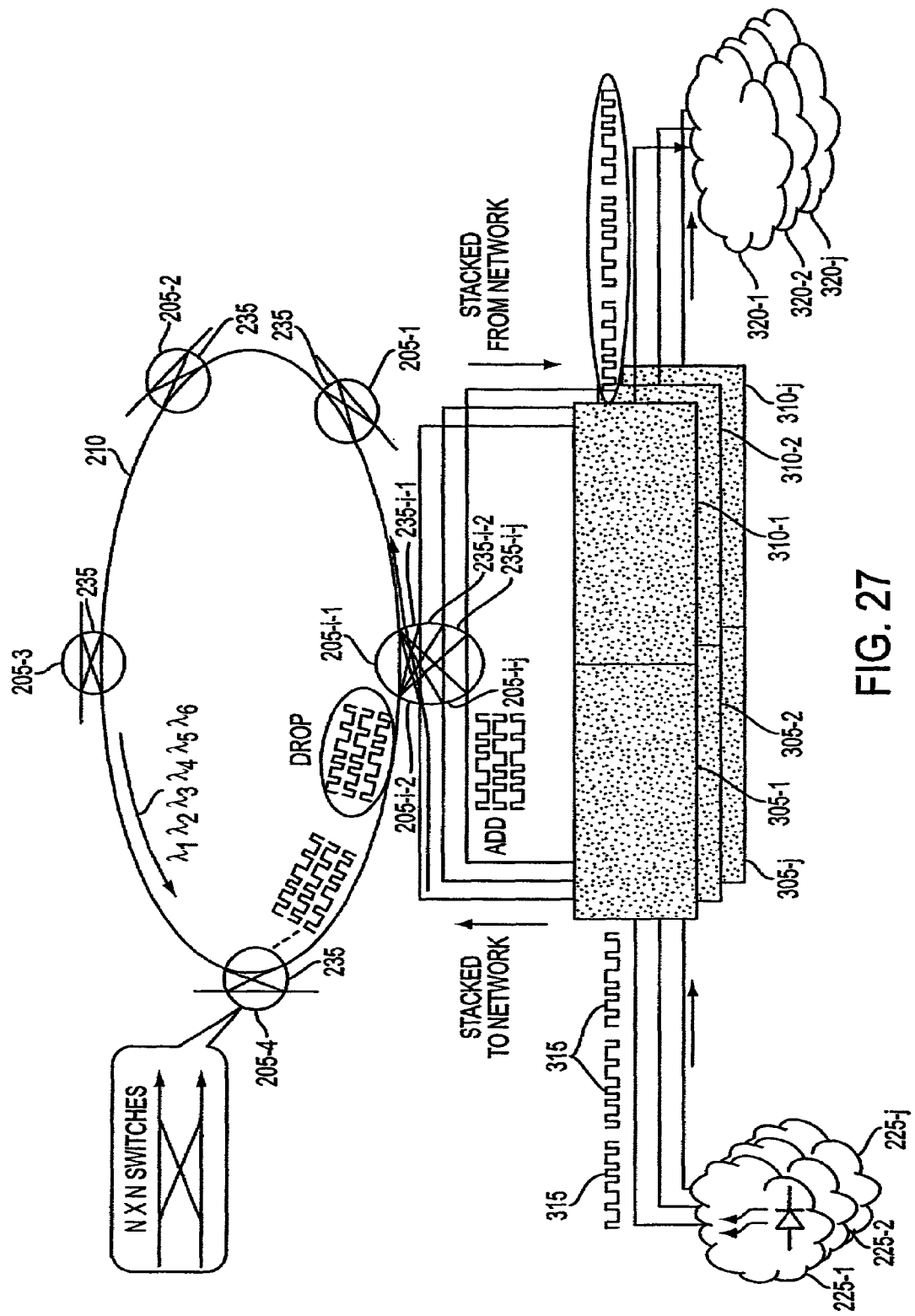
FIG. 27 illustrates multiple nodes for the core optical ring to communicate to multiple subtending systems.

FIG. 27 is similar to FIG. 3 and is, therefore, similarly labeled. However, in FIG. 27 a plurality of nodes are illustrated with the core optical ring 210 in communication with each of the exploded view nodes 205-i-1, 205-i-2, . . . , 205-i-j, and where each node further has its own switch 235-i-1, 235-i-2, . . . , 235-i-j, its own tunable laser 225-1, 225-2, . . . , 225-j, its own stacker 305-1, 305-2, . . . , 305-j, its own unstacker 310-1, 310-2, . . . , 310-j, and its own detector 320-1, 320-2, . . . , 320-j. FIG. 27 further illustrates the use of n×n switches to connect multiple subtending systems to the core optical ring 210. Composite packets for a time slot may be provided by any of the subtending systems.

Figure 28:
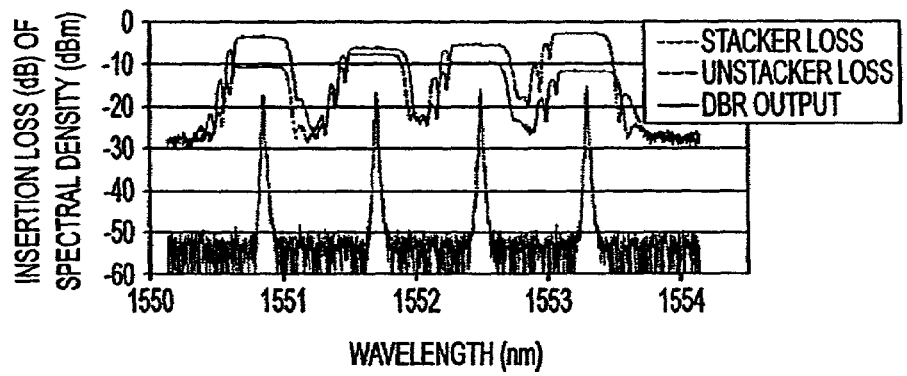
FIG. 28 shows spectral responses of the stacker at node 1, the unstacker at node 2 and time averaged tunable DBR laser output spectrum at node 1.

To prove the concept, a 2-node demonstration network has been constructed. Each node contains a 4-wavelength stacker/unstacker unit with 100-GHz wavelength spacing and the same FBG arrangement. One node is used for stacking and the other for unstacking. Adjacent FBGs in the stacker/unstacker are separated by 2 km, which corresponds to a photonic time slot length of about 20 µs. FIG. 28 shows the matching among the spectral response of the stacker and the unstacker, and the output wavelengths of the tunable DBR laser. The insertion loss in both the stacker and unstacker increases as the distance of the FBG from the circulator increases, although they tend to balance each other out. This cascading loss is mainly due to the connectors in the setup, which can be greatly reduced by fusion splicing the fibers with FBGs.

A tunable DBR laser with monolithically integrated semiconductor amplifier, and 2.5 Gb/s electro-absorption (EA) modulator (as described in "2.5 Gb/s transmission over 680 km using a fully stabilized 20 channel DBR laser with monolithically integrated semiconductor optical amplifier, photodetector, and electroabsorption modulator," by L. J. P. Ketelsen, J. E. Johnson, D. A. Ackerman, L. Zhang, K. K., Kamath, M. S. Hybertsen, K. G. Glogovsky, M. W. Focht, W. A. Asous, C. L. Reynolds, C. W. Ebert, M. Park, C. W. Lentz, R. L. Hartman and T. L. Koch, published in the Proceedings of OFC 2000 (PD14), Baltimore, Md.), is packaged with high-speed electrical connections to both tuning and modulator sections. Together with a stacker at Node 1, the DBR laser generates the composite packets. The DBR laser frequencies, which can be trimmed by temperature tuning, can be discretely switched on a 100 GHz spaced comb of 9 channels in less than 5 ns.

Figure 29A:
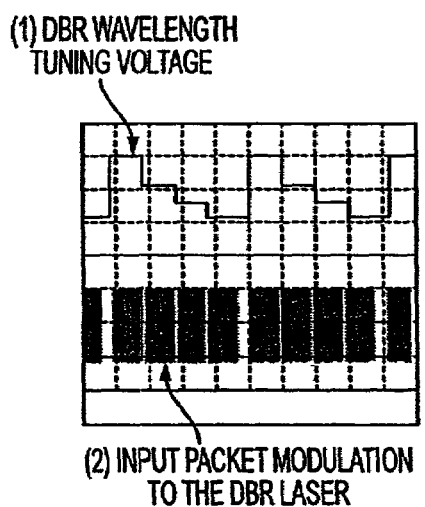
FIG. 29a depicts the alignment of DBR wavelength tuning voltage with the input packet modulation data.
Figure 29B:
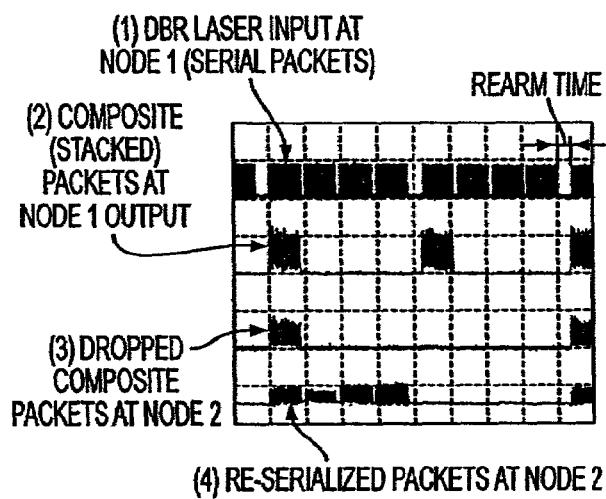
FIG. 29b shows the scope trace of input, stacked, dropped and re-serialized packet data measured by a photodetector.
Figure 30:
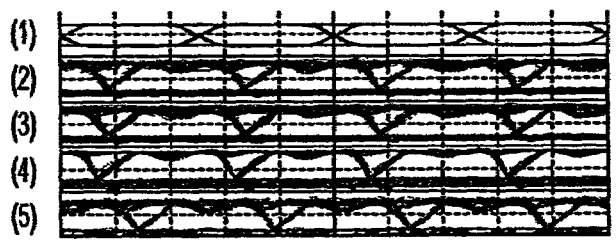
FIG. 30 shows (1) the eye diagrams of the input packets at node 1 (or back-to-back) and at (2)–(5) the eye diagrams of the recovered individual wavelength at node 2.

An arbitrary waveform generator is programmed for the DBR laser wavelength tuning (Trace 1 in FIG. 29a). The serial packet data (Trace 2 in FIG. 29a) at 200 MHz bit rate are generated by a Tektronix HFS9003 stimulus pattern generator synchronized to the wavelength tuning voltage and applied to the EA modulator section of the DBR laser. The first trace in FIG. 29b shows the input packet modulation signal to the tunable DBR laser. A 3904-bit (488-byte) packet size consisting of 3824 random bits and 80-bit guard time was adopted. During the guard time, the laser output is turned off using the built-in EA modulator to avoid spurious wavelength output during wavelength transition. The guard time also allows for timing jitter produced by the mismatches in the fiber delay lines between the FBGs. In an exemplary embodiment, to cope with the pattern generator trigger requirement, an extra 1120-bit trigger rearm time interval is inserted between every 4 serial packets (which make up a composite packet), as shown in FIG. 29b. This rearm time also helps to identify the packets on the scope traces and its necessity and duration will vary according to the configuration of the network. Trace 2 of FIG. 29b shows the stacked composite packets. Individual wavelengths are very well aligned as indicated. The stacked packets are transmitted through a 5-km long single mode fiber to Node 2 where a 2×2 LiNbO$_3$ switch is used to drop every other composite packet from Node 1 (Trace 3 of FIG. 29b). The dropped composite packet is optically amplified with a low noise optical preamplifier and re-serialized at the unstacker output of Node 2 (race 4 of FIG. 29b). The dropped packets at all four wavelengths were successfully recovered using an Avalanche PhotoDiode (APD), which is a particular kind of fast and sensitive photodetector. FIG. 30 shows the eye diagram of the input packets and those of the demultiplexed packets at each individual wavelength. system and method for a novel high connectivity composite packet-switching system have been described and successfully demonstrated. The system and method described uses a single tunable laser source and passive optical components at each node. This can an economical solution for IP networks, which require high connectivity and packet-stitching. Photonic slot routing schemes not only could be useful for local area networks t also could be an economically viable solution for interconnecting large router farms. should be clear from the foregoing that the objectives of the invention have been met.

While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

The invention claimed is:

1. A method for providing high connectivity communications over an optical ring network comprising the steps of:
    generating a set of serial packets by a tunable laser;
    stacking said set of serial packets to form a first composite packet by said stacker;
    performing a serial-to-parallel conversion process such that said first composite packet is in a single photonic time slot;
    flipping an optical crossbar switch connecting a core optical ring to said stacker to a cross state;
    adding said first composite packet to said core optical ring via said optical crossbar switch such that said first composite packet propagates on said core optical ring for distribution to said first composite packet's destination;
    at least one second composite packet circulating around said core optical ring for distribution to said second composite packet's destination;
    locating said destination of said second composite packet;
    dropping said second composite packet at said destination for said second composite packet; and
    distributing said composite packet by wavelength.

2. A method for accomplishing transparent bypass over a high connectivity communications optical ring network comprising the steps of:

determining that a first composite packet, propagating on a core optical ring, is to be dropped at a node of said core optical ring, said node having an optical crossbar switch, said optical crossbar switch further coupled to a subtending system such that said first composite packet is able to be further distributed on said subtending system;

flipping said optical crossbar switch into a bar state;

dropping said first composite packet via said flipped optical crossbar switch; receiving by a first WDM of said first composite packet;

filtering and separating, by said first WDM wavelengths of parallel packets comprising said first composite packet, that are to be further distributed on said subtending system;

serializing said parallel packets;

further distributing said serialized packets;

forwarding wavelengths not destined for further distribution on said subtending system to a second WDM; and outputting said wavelengths not destined for further distribution back onto said core optical ring in a vacant photonic time slot via said optical crossbar switch in said cross state.

3. The method according to claim 2, further comprising the steps of:

generating a serial stream of packets;

forming a second composite packet in a single photonic time slot from said serial stream of packets; and interleaving said second composite packet with said wavelengths not destined for further distribution on said subtending system prior to outputting said wavelengths not destined for further distribution on said subtending system back onto said core optical ring.

4. A method for accomplishing transparent bypass over a high connectivity communications optical ring network comprising the steps of:

dropping a first composite packet comprising a plurality of parallel packets at a node of a core optical ring via an optical crossbar switch in a cross state;

serializing and further distributing a first portion of said plurality of parallel packets; and passing a second portion of said plurality of parallel packets through and outputting said second portion of said plurality of parallel packets back onto said core optical ring, wherein said serializing step is accomplished via a plurality of three- and four-port circulators and a plurality of fiber Bragg gratings (FBGs).

5. The method according to claim 4, wherein said passing step is accomplished via said plurality of three- and four-port circulators and said plurality of FBGs.

* * * * *